United States Patent
Park et al.

(10) Patent No.: US 10,939,099 B2
(45) Date of Patent: Mar. 2, 2021

(54) INTER PREDICTION MODE-BASED IMAGE PROCESSING METHOD AND DEVICE THEREFOR

(71) Applicant: LG Electronics Inc., Seoul (KR)

(72) Inventors: Naeri Park, Seoul (KR); Jaehyun Lim, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 16/095,590

(22) PCT Filed: Apr. 22, 2016

(86) PCT No.: PCT/KR2016/004248
§ 371 (c)(1),
(2) Date: Oct. 22, 2018

(87) PCT Pub. No.: WO2017/183751
PCT Pub. Date: Oct. 26, 2017

(65) Prior Publication Data
US 2019/0098299 A1    Mar. 28, 2019

(51) Int. Cl.
*H04N 19/109*   (2014.01)
*H04N 19/119*   (2014.01)
(Continued)

(52) U.S. Cl.
CPC ......... *H04N 19/109* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

2013/0322542 A1* 12/2013 Senzaki ............... H04N 19/139
375/240.16
2013/0336397 A1* 12/2013 Senzaki ............... H04N 19/503
375/240.12
(Continued)

FOREIGN PATENT DOCUMENTS

JP      2016-506165 A      2/2016
KR   1020100080792 A      7/2010
(Continued)

*Primary Examiner* — Jeremiah C Hallenbeck-Huber
(74) *Attorney, Agent, or Firm* — Fish & Richardson P.C.

(57) ABSTRACT

The present invention discloses an inter prediction mode-based image processing method and an apparatus therefore. Specifically, a method for processing an image based on an inter prediction may include: deriving motion information of a first prediction unit determined by a first partitioning mode of a current block and motion information of a second prediction unit determined by a second partitioning mode of the current block; generating a prediction block of the first prediction unit by using the motion information of the first prediction unit and generating a prediction block of the second prediction unit by using the motion information of the second prediction unit; and generating a prediction block of the current block in units of sub-prediction unit determined by combining the first prediction unit and the second prediction unit by using the first prediction block and the second prediction block.

11 Claims, 15 Drawing Sheets

(51) Int. Cl.
  *H04N 19/105* (2014.01)
  *H04N 19/70* (2014.01)
  *H04N 19/157* (2014.01)
  *H04N 19/513* (2014.01)
  *H04N 19/176* (2014.01)
  *H04N 19/577* (2014.01)

(52) U.S. Cl.
  CPC ......... *H04N 19/157* (2014.11); *H04N 19/176* (2014.11); *H04N 19/513* (2014.11); *H04N 19/577* (2014.11); *H04N 19/70* (2014.11)

(56) References Cited

U.S. PATENT DOCUMENTS

| | | | |
|---|---|---|---|
| 2014/0098189 A1* | 4/2014 | Deng | H04N 19/176 |
| | | | 348/43 |
| 2014/0133570 A1* | 5/2014 | Lee | H04N 19/593 |
| | | | 375/240.16 |
| 2014/0211850 A1* | 7/2014 | Zhang | H04N 19/13 |
| | | | 375/240.12 |
| 2015/0296222 A1* | 10/2015 | Llin | H04N 19/597 |
| | | | 375/240.16 |
| 2016/0050419 A1* | 2/2016 | Zhao | H04N 19/176 |
| | | | 375/240.12 |
| 2016/0165209 A1* | 6/2016 | Huang | H04N 19/597 |
| | | | 348/43 |
| 2016/0219302 A1* | 7/2016 | Liu | H04N 19/583 |
| 2016/0234510 A1* | 8/2016 | Lin | H04N 13/161 |
| 2016/0286232 A1* | 9/2016 | Li | H04N 19/70 |
| 2017/0302930 A1* | 10/2017 | Mora | H04N 19/40 |
| 2018/0041768 A1* | 2/2018 | Koo | H04N 19/132 |
| 2018/0376137 A1* | 12/2018 | Jun | H04N 19/105 |

FOREIGN PATENT DOCUMENTS

| | | |
|---|---|---|
| KR | 1020150056610 A | 5/2015 |
| KR | 1020150076134 A | 7/2015 |
| KR | 1020150086533 A | 7/2015 |

* cited by examiner

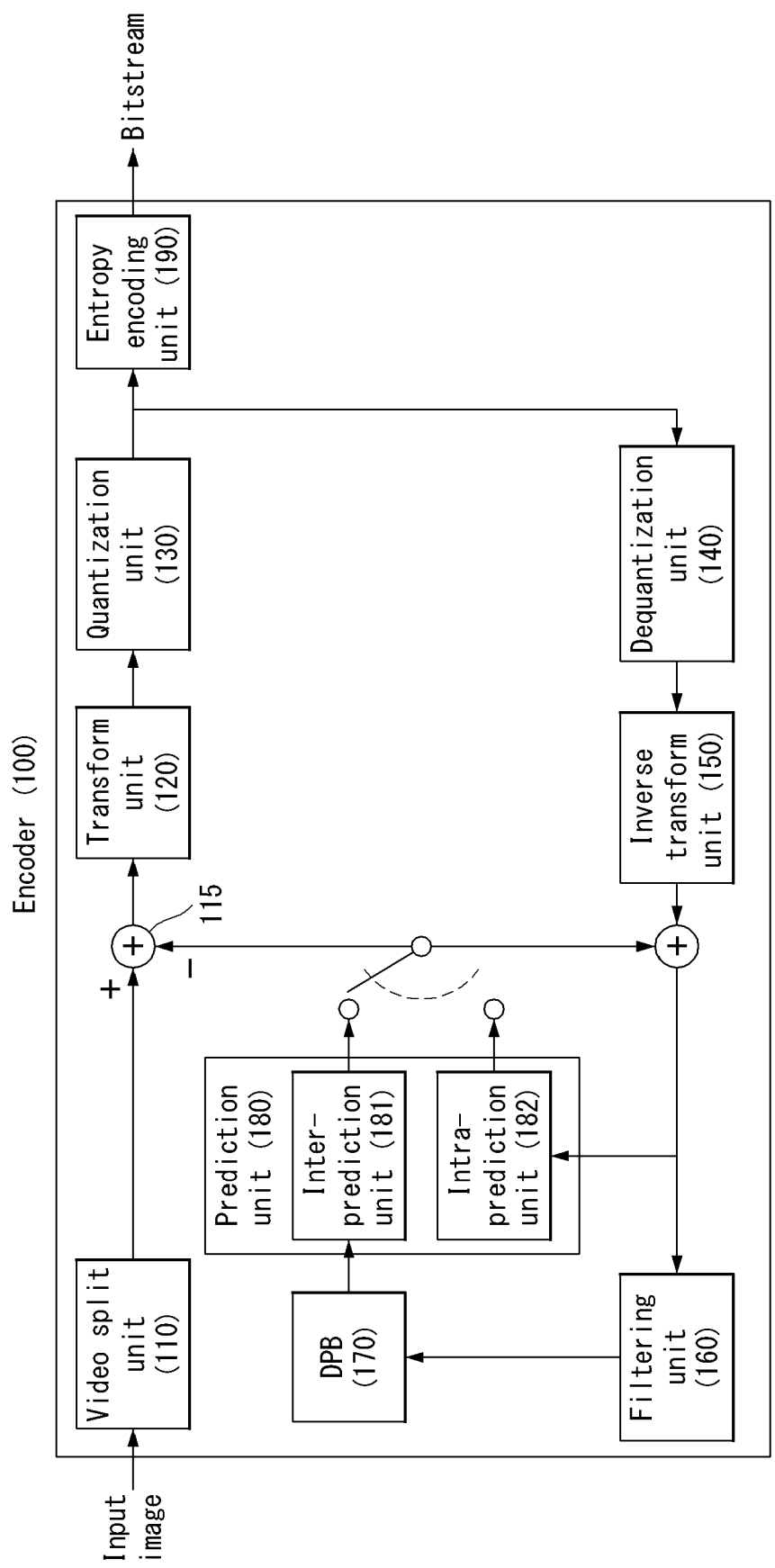
[FIG. 1]

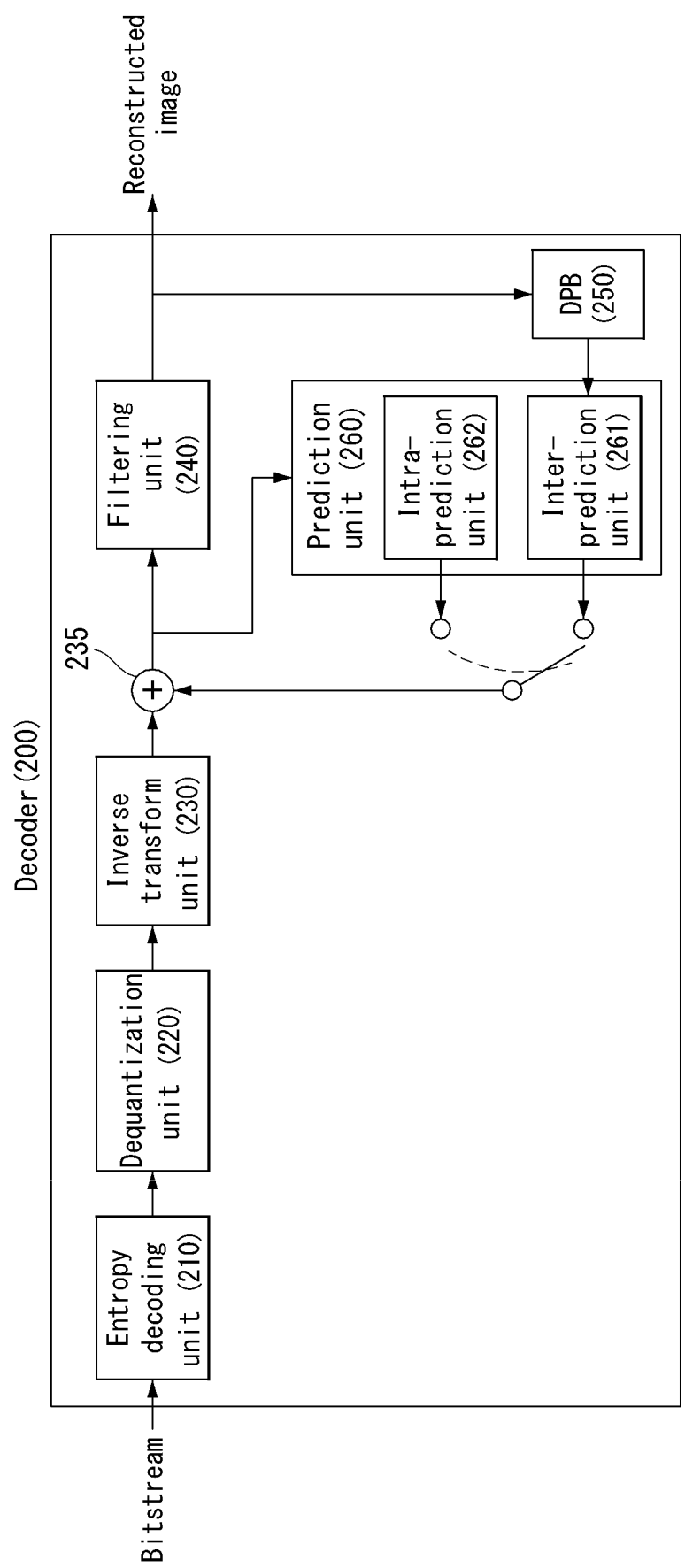

[FIG. 3]
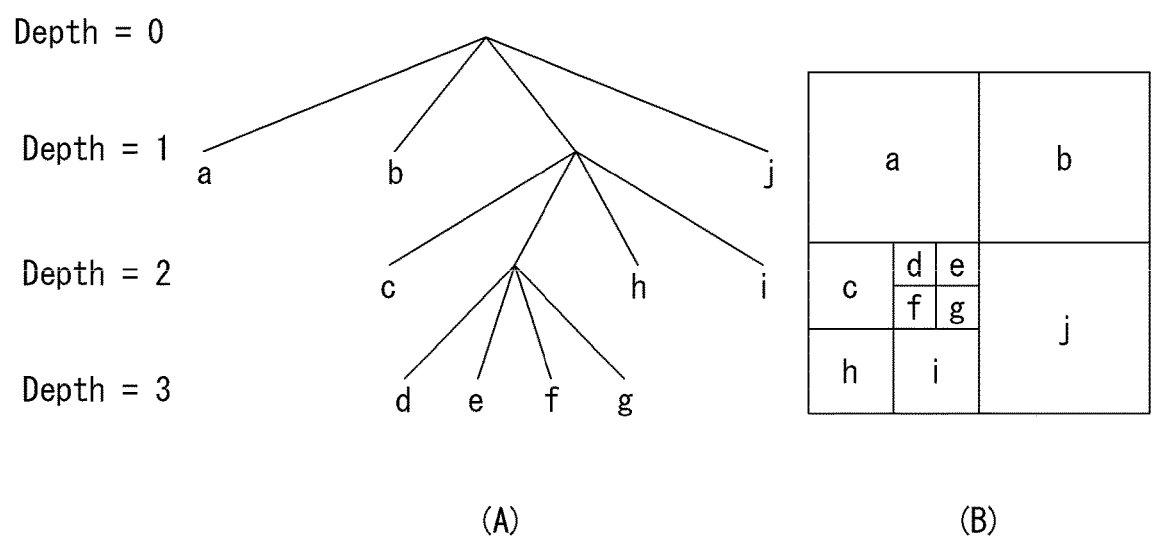
(A)            (B)

[FIG. 4]
Intra:
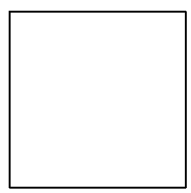 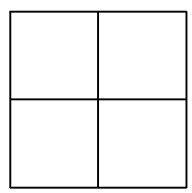
2Nx2N   NxN
Inter:
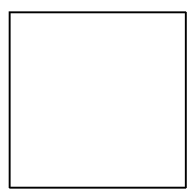 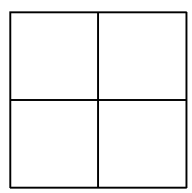 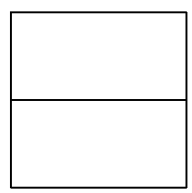 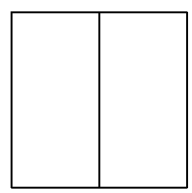
2Nx2N   NxN   2NxN   Nx2N
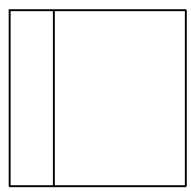 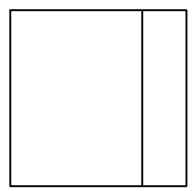 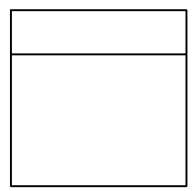 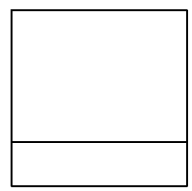
nLx2N   nRx2N   2NxnU   2NxnD

[FIG. 5]
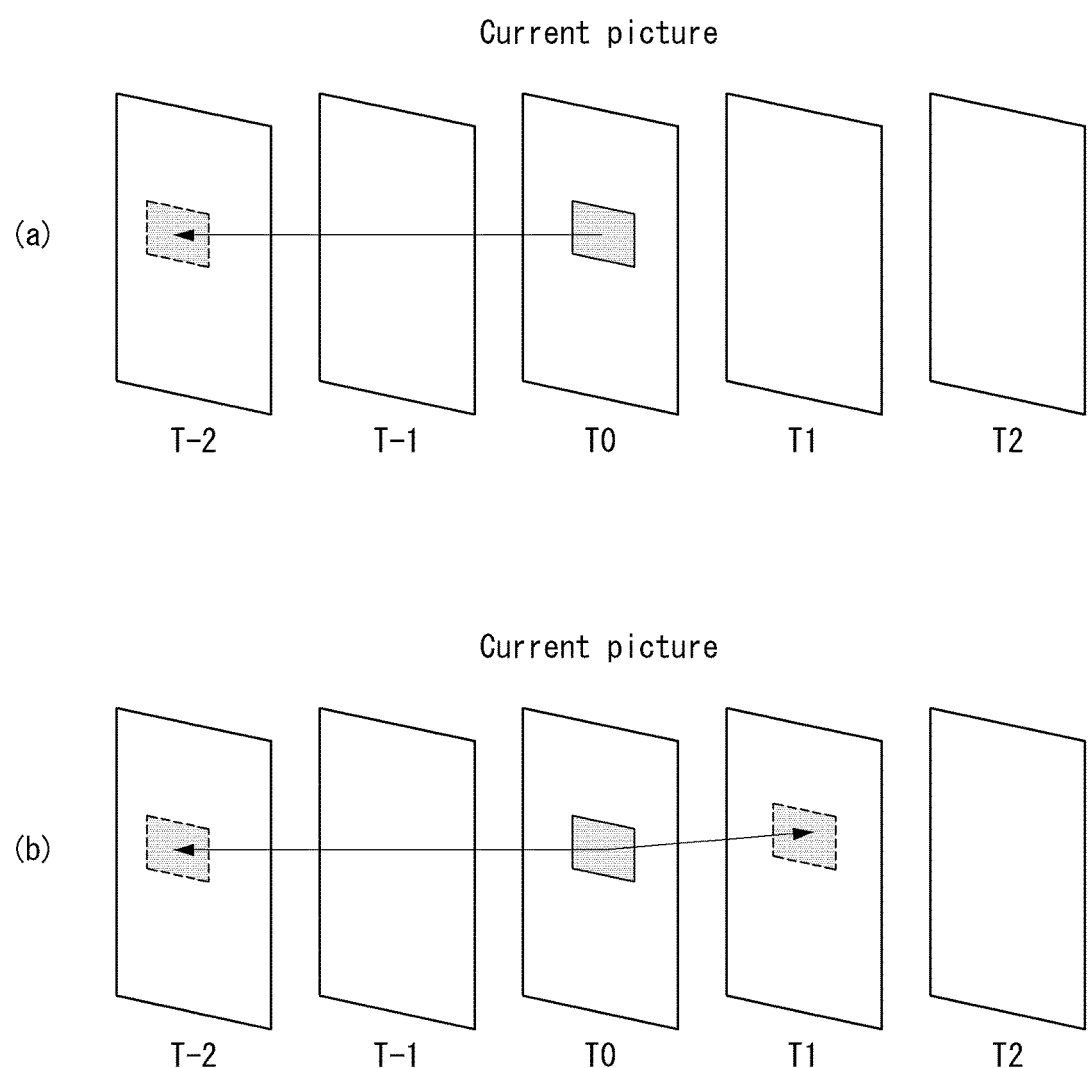

[FIG. 6]

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

[FIG. 7]
(a) 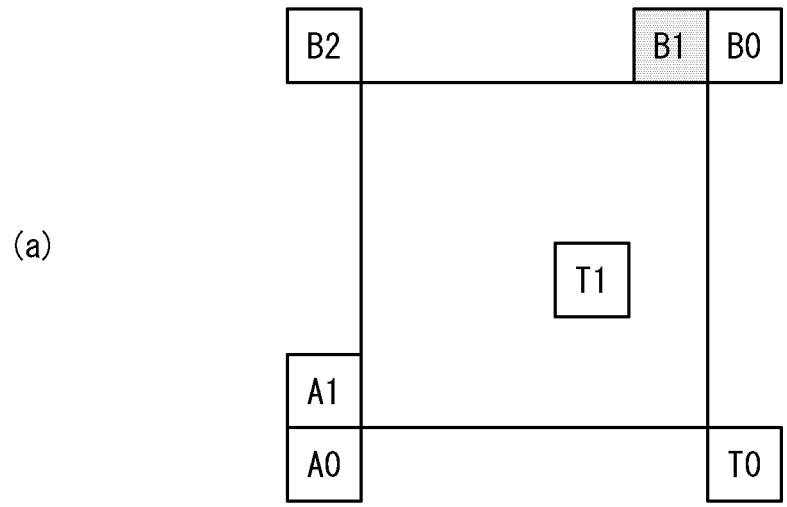
(b) 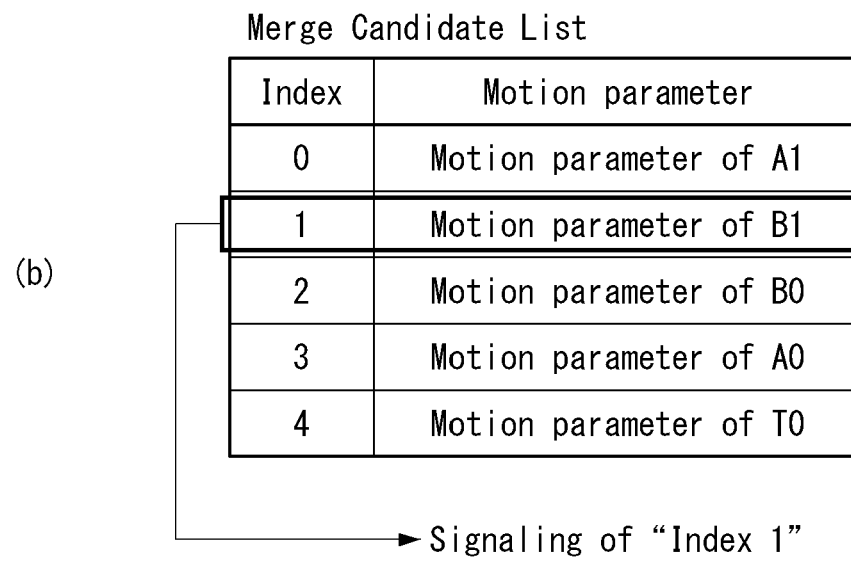

[FIG. 8]
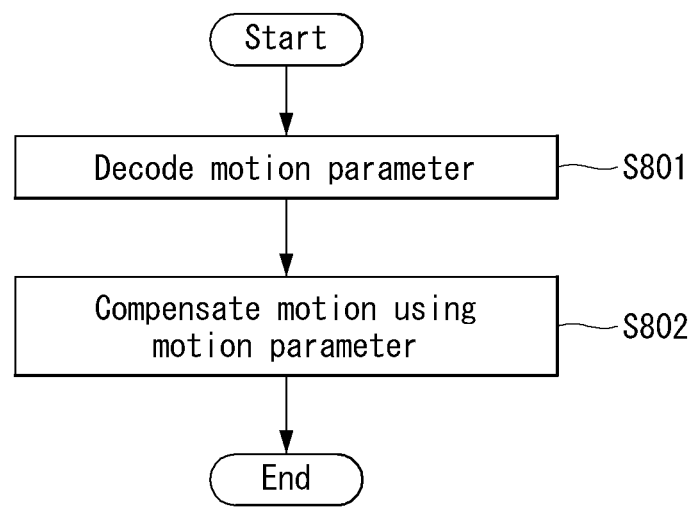

[FIG. 9]
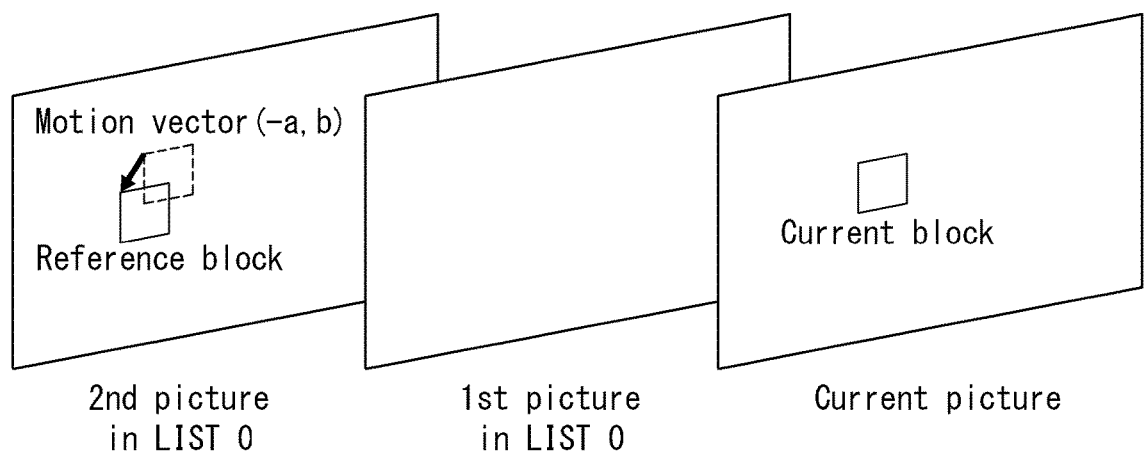
[FIG. 10]
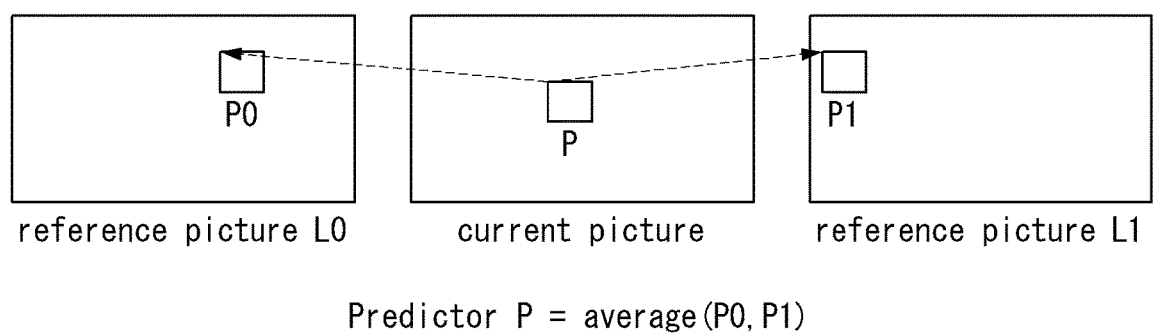
Predictor P = average(P0, P1)

[FIG. 11]
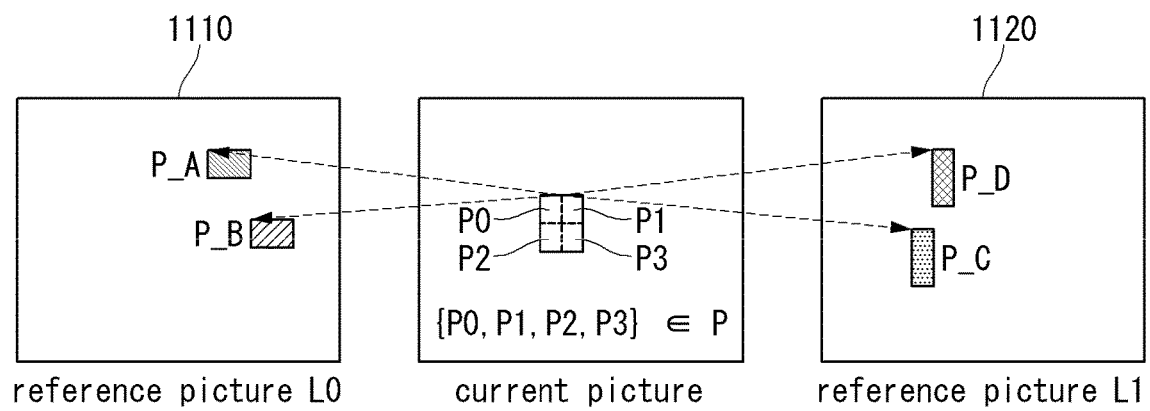

[FIG. 12]
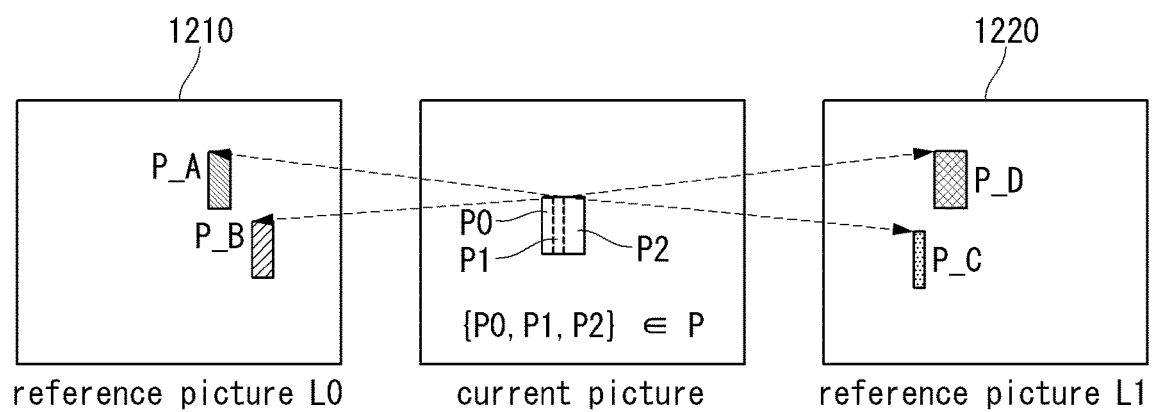

[FIG. 13]
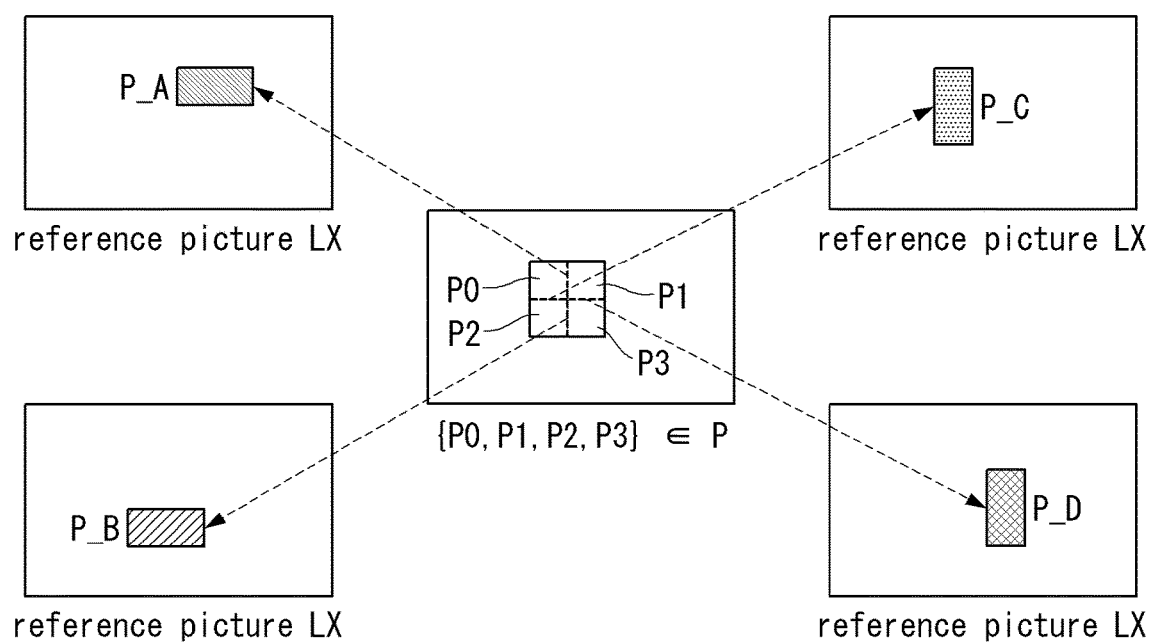

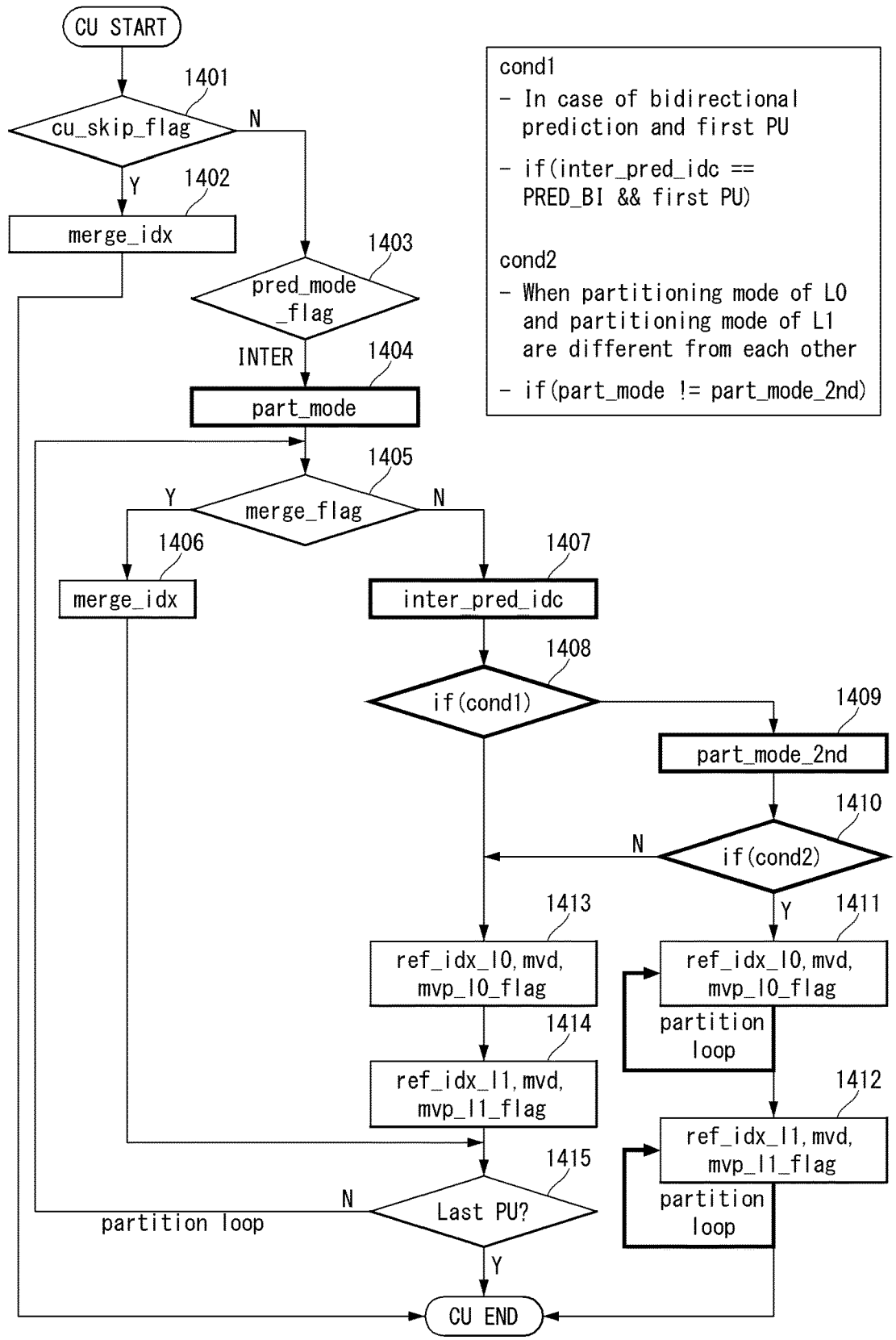
[FIG. 14]

[FIG. 15]
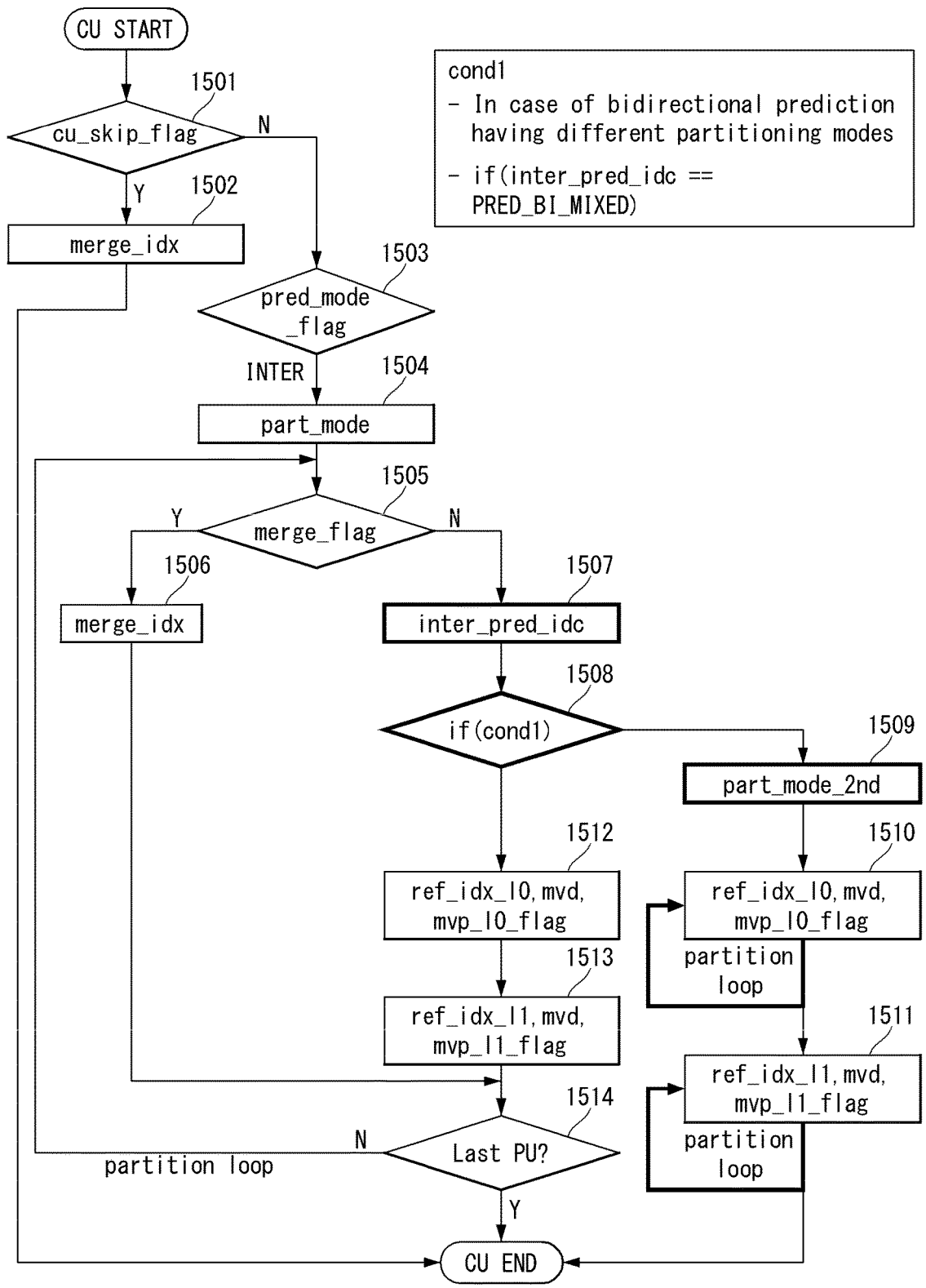

[FIG. 16]
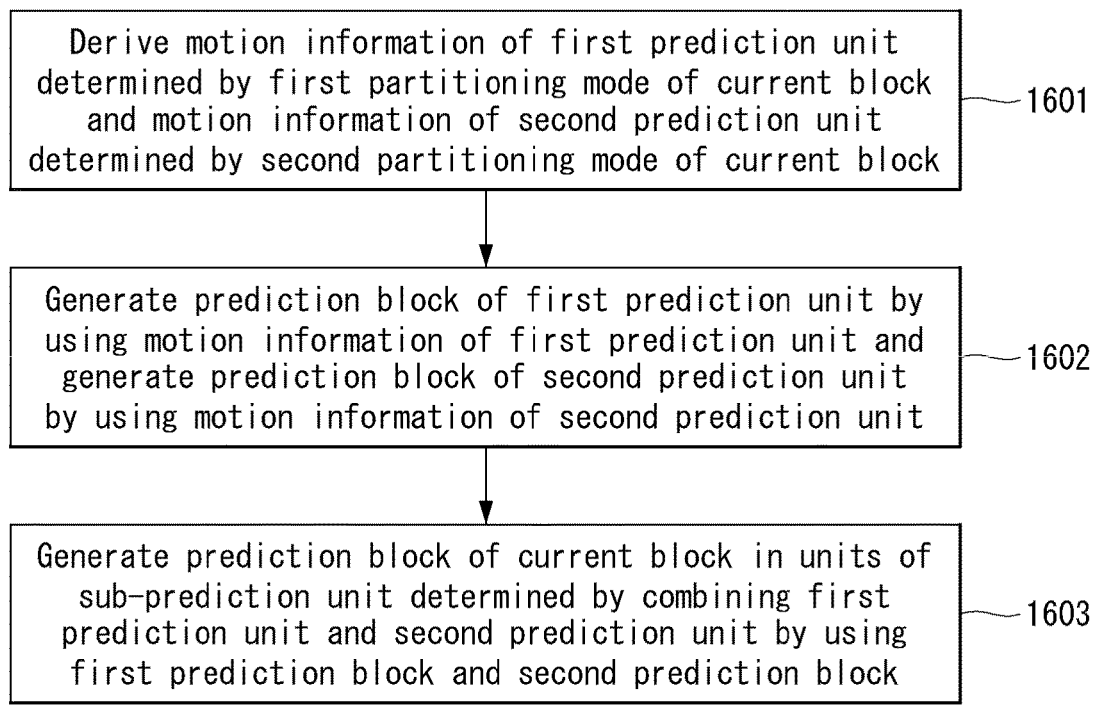
[FIG. 17]
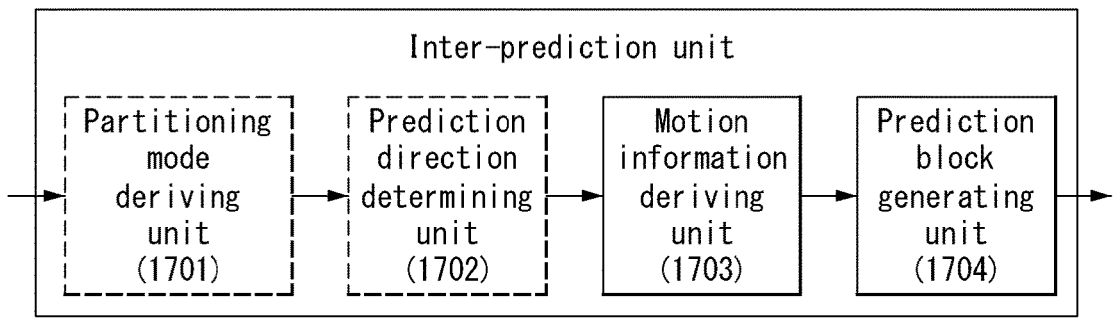

INTER PREDICTION MODE-BASED IMAGE PROCESSING METHOD AND DEVICE THEREFOR

CROSS-REFERENCE TO RELATED APPLICATIONS

This application is a National Stage application under 35 U.S.C. § 371 of International Application No. PCT/KR2016/004248, filed on Apr. 22, 2016, the disclosure of which is incorporated by reference in its entirety.

TECHNICAL FIELD

The present invention relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In a moving picture compression technique in the related art, a prediction block of the same type is averaged to generate a final prediction block when a bi-directional inter prediction is predicted. In this case, it is difficult to minimize a prediction error and compression performance is deteriorated due to splitting of a prediction unit and an increase of an additional information amount including motion information.

In order to solve the above problem, an embodiment of the present invention is to propose a method for performing an inter prediction by using a plurality of partitioning modes and a method for processing an image based thereon.

Furthermore, an embodiment of the present invention is to propose a method for performing an inter prediction by differently applying bidirectional partitioning modes and a method for processing an image based thereon.

Technical objects to be achieved in the present invention are not limited to the aforementioned technical objects, and other technical objects not described above may be evidently understood by a person having ordinary skill in the art to which the present invention pertains from the following description.

Technical Solution

In an aspect of the present invention, a method for processing an image based on an inter prediction may include: deriving motion information of a first prediction unit determined by a first partitioning mode of a current block and motion information of a second prediction unit determined by a second partitioning mode of the current block; generating a prediction block of the first prediction unit by using the motion information of the first prediction unit and generating a prediction block of the second prediction unit by using the motion information of the second prediction unit; and generating a prediction block of the current block in units of sub-prediction unit determined by combining the first prediction unit and the second prediction unit by using the first prediction block and the second prediction block.

In another aspect of the present invention, an apparatus for processing an image based on an inter prediction may include: a motion information deriving unit deriving motion information of a first prediction unit determined by a first partitioning mode of a current block and motion information of a second prediction unit determined by a second partitioning mode of the current block; and a prediction block generating unit generating a prediction block of the first prediction unit by using the motion information of the first prediction unit and generating a prediction block of the second prediction unit by using the motion information of the second prediction unit and generating a prediction block of the current block in units of sub-prediction unit determined by combining the first prediction unit and the second prediction unit by using the first prediction block and the second prediction block.

Preferably, a prediction block of the sub-prediction unit may be generated by averaging or weighting a portion corresponding to the sub-prediction unit in the first prediction block and a portion corresponding to the sub-prediction unit in the second prediction block.

Preferably, first prediction block may be generated by referring to a reference picture of reference picture list 0 and the second prediction block may be generated by referring to the reference picture of reference picture list 1.

Preferably, the second partitioning mode may indicate a partitioning mode of the reference picture of reference picture list 1.

Preferably, when a current prediction unit is a first prediction unit and a bidirectional prediction is applied, the second partitioning mode may be received.

Preferably, when the second partitioning mode is received, and the first partitioning mode and the second partitioning mode are different, the first partitioning mode may indicate a partitioning mode of the reference picture of reference picture list 0.

Preferably, when the second partitioning mode is received, and the first partitioning mode and the second partitioning mode are different, inter prediction direction information for the current block may indicate a bidirectional prediction of a coding unit.

Preferably, when the inter prediction direction information for the current block indicates that the bidirectional prediction in which different partitioning modes are used for each reference picture are used to the current block, the second partitioning mode may be received.

Preferably, when the second partitioning mode is received, the first partitioning mode may indicate a partitioning mode of the reference picture of reference picture list 0.

Preferably, a most probable mode (MPM) candidate list for the second partitioning mode may be configured based on the first partitioning mode.

Preferably, a value of 0 may be allocated to a partitioning mode which has the same partitioning width and partitioning height as the first partitioning mode in the MPM candidate list.

Preferably, a small value may be preferentially allocated to the partitioning mode which has the same partitioning width and partitioning height as the first partitioning mode.

Preferably, the first partitioning mode may be any one of 2N×2N, 2N×N, N×2N, N×N, 2N×nU, 2N×nD, nL×2N, and nR×2N and the second partitioning mode is any one of partitioning modes different from the first partitioning mode.

Preferably, the motion information may include a reference picture index indicating a reference picture, a motion vector difference value, and motion vector prediction value information indicating a motion vector prediction value index within a motion vector prediction candidate list.

Advantageous Effects

According to an embodiment of the present invention, by generating prediction blocks of various shapes by applying a plurality of different partitioning modes, a prediction error is reduced to enhance compression performance.

Further, according to an embodiment of the present invention, the plurality of different partitioning modes is applied to reduce additional information generated due to splitting into small coding units in the related art, thereby enhancing the compression performance.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for ¼ sample interpolation and a fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 is a diagram illustrating a bidirectional inter prediction to which a single partitioning mode is applied.

FIG. 11 is a diagram illustrating a method for generating a prediction block by applying a different partitioning mode for each reference picture according to an embodiment of the present invention.

FIG. 12 is a diagram illustrating a method for generating a prediction block by applying a different partitioning mode for each reference picture according to an embodiment of the present invention.

FIG. 13 is a diagram illustrating a method for generating a prediction block by applying a plurality of partitioning modes according to an embodiment of the present invention.

FIG. 14 is a diagram illustrating a method for parsing a syntax element of a coding unit from a bitstream according to an embodiment of the present invention.

FIG. 15 is a diagram illustrating a method for parsing a syntax element of a coding unit from a bitstream according to an embodiment of the present invention.

FIG. 16 is a diagram illustrating an inter prediction method according to an embodiment of the present invention.

FIG. 17 is a diagram illustrating an inter prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present invention is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16)(16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information).

Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

FIG. 6 is an embodiment to which the present invention may be applied and illustrates integers for ¼ sample interpolation and a fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present invention may be applied and illustrates the location of a spatial candidate.

Referring to FIG. 7(a), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx[x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Inter Prediction-Based Image Processing Method

As the resolution and the complexity of the image have been diversified, prediction blocks having various sizes and shapes have appeared as a method for efficiently compressing the image.

Referring again to FIG. 4 above, the size of the prediction bloc has been diversified from 64×64 to 4×4 in order to reduce a prediction error and in particular, in an inter prediction mode, partitioning modes such as 2N×2N, 2N×N, N×2N, and N×N which are the conventional prediction block shapes and partitioning modes such as 2N×nU, 2N×nD, nL×2N, and nR×2N which are asymmetric prediction block shapes are introduced.

Among various partitioning modes, a partitioning mode to minimize rate-distortion cost (RDCos) considering the prediction error and an occurrence bit rate is generally selected. In addition, the selected partitioning mode is distinguished as a partitioning mode ('part_mode') as shown in Table 1 below and 'part_mode' is signaled to a decoder.

TABLE 1

| part_mode | Name of part_mode |
|---|---|
| 0 | PART_2Nx2N |
| 1 | PART_2NxN |
| 2 | PART_Nx2N |
| 3 | PART_NxN |
| 4 | PART_2NxnU |
| 5 | PART_2NxnD |
| 6 | PART_nLx2N |
| 7 | PART_nRx2N |

FIG. 10 is a diagram illustrating a bidirectional inter prediction to which a single partitioning mode is applied.

In HEVC, the partitioning mode exists in units of a coding block and in the case of the bidirectional inter prediction, an average value is taken by searching reference blocks P0 and P1 having the same shape as a current block P to generate a final reference block (Predictor P=average (P0, P1)) (i.e., a prediction block). That is, the decoder receives the partitioning mode from an encoder in units of the coding block and generates prediction blocks partitioned according to the received partitioning mode.

In this case, when the bidirectional inter prediction is applied to the prediction block, the decoder derives a motion vector for each reference picture. As described above, the motion vector may be derived in a merge mode or an AMVP mode. In addition, the decoder may generate the prediction block by averaging respective reference blocks having the same shape as the prediction block identified by using the motion vector within respective reference pictures.

However, since only reference blocks having the same shape are targeted in both directions, the prediction error may be large in a partial area of the block and in particular, when motion patterns and complexities of list 0 (list 0) reference picture and list 1 (list 1) reference picture are different from each other, the prediction error becomes large.

In addition, when sizes and directions of the motion vectors of the reference pictures are different from each other or the complexities are different from each other, the size of the prediction block may be reduced, for example, an N×N partitioning mode is applied, etc. Therefore, there is a tendency that an additional information amount including block splitting and motion information increases to degrade the compression performance.

In order to solve such a problem, the present invention proposes a method for increasing prediction performance by reducing the prediction error and additional information by combining various prediction block shapes by applying a different partitioning mode for each reference picture.

Hereinafter, in the description of the present invention, generating the prediction block in units of the prediction unit may mean deriving an array of a prediction sample configuring the prediction unit.

Embodiment 1

A description will be given of a possible prediction structure when the method proposed by the present invention is applied with reference to the following drawings. Since the partitioning modes of two reference pictures are different from each other, various combinations of reference blocks may be selected.

FIG. 11 is a diagram illustrating a method for generating a prediction block by applying a different partitioning mode for each reference picture according to an embodiment of the present invention.

In FIG. 11, illustrated is a case where when it is assumed that the size of the current block (for example, a coding unit) is 2N×2N, a partitioning mode (i.e., L0 partitioning mode or first partitioning mode) of a reference picture (reference picture L0) 1110 (or first reference picture) of reference picture list 0 is 2N×N and a partitioning mode (i.e., L1 partitioning mode or second partitioning mode) is N×2N.

Hereinafter, in this specification, a prediction unit in which the inter prediction is performed will be referred to as L0 prediction unit (or first prediction unit) (in the case of FIG. 11, two 2N×N size prediction units) by referring to the L0 reference picture 1110 and an inter-predicted block will be referred to as an L0 prediction block (or first prediction block, in the case of FIG. 11, P_A and P_B) by referring to the L0 reference picture 1110. Similarly, the prediction unit in which the inter prediction is performed will be referred to as L1 prediction unit (or second prediction unit) (in the case of FIG. 11, two N×2N size prediction units) by referring to the L1 reference picture L1 1120 and the inter-predicted block will be referred to as an L1 prediction block (or second prediction block, in the case of FIG. 11, P_C and P_D) by referring to the L1 reference picture 1120.

Further, in this specification, the L0 prediction unit (or first prediction unit) included in one coding unit will be referred to as a first L0 prediction unit, a second L0 prediction unit, etc. in a vertical direction, a horizontal direction, or a z-order scan direction. Similarly, the L1 prediction unit (or second prediction unit) included in one coding unit will be referred to as the first L0 prediction unit, the second L0 prediction unit, etc. in the vertical direction, the horizontal direction, or the z-order scan direction.

The prediction unit of the current block may be determined by combining the partitioning mode for each reference picture. That is, as illustrated in FIG. 11, when the partitioning mode of the L0 reference picture 1110 is 2N×N and the partitioning mode of the L1 reference picture 1120 is N×2N, the prediction unit of the current block may be determined as an N×N size.

In this specification, for convenience of description, the prediction unit of the current block is referred to as a 'sub prediction unit' in order to distinguish the prediction unit of the current block into an L0 prediction unit and an L1 prediction unit.

The decoder may generate the prediction block of the sub prediction unit by using the prediction block of the L0 prediction unit and the prediction block of the L1 prediction unit and generate the prediction block of the current block by merging the prediction blocks. In addition, the decoder sums and then merges the prediction block and a residual block for each sub prediction unit or sums the prediction block of the current block and the residual block to generate a reconstructed block for the current block.

More specifically, the decoder may derive motion information of the L0 prediction unit (first prediction unit) and derive motion information of the L1 prediction unit (second prediction unit).

Here, the motion information may include reference picture information (for example, reference picture index) indicating the reference picture, motion vector prediction value information (for example, a motion vector prediction value flag) indicating a motion vector prediction value within a motion vector prediction value candidate list, and/or motion vector difference value information.

The decoder generates the prediction block (i.e., P_A and P_B) of the L0 prediction unit and the prediction block (P_C and P_D) of the L1 prediction unit by using the derived motion information. That is, the prediction block P_A of a first L0 prediction unit is generated from the reference block (or reference sample) in the L0 reference picture using the motion information of the prediction unit, the prediction block P_B of a second L0 prediction unit is generated from the reference block (or reference sample) within the L0 reference picture using the motion information of the prediction unit, the prediction block P_C of a first L1 prediction unit is generated from the reference block (or reference sample) in the L1 reference picture by using the motion information of the prediction unit, and the prediction block P_D of a second L1 prediction unit is generated from the reference block (or reference sample) in the L1 reference picture using the motion information of the prediction unit.

In addition, the prediction blocks (i.e., P0, P1, P2, and P3) of the sub prediction units of the current block may be generated from the average values of the prediction blocks (i.e., P_A and P_B) of the L0 prediction unit and the prediction blocks (P_C and P_D) of the L1 prediction unit.

In other words, the prediction blocks (i.e., P0, P1, P2, and P3) for each sub prediction unit of the current block may be generated from the average values of the areas corresponding to the corresponding sub prediction units within the prediction blocks (i.e., P_A and P_B) of the L0 prediction unit and the prediction blocks (P_C and P_D) of the L1 prediction unit. In this case, for convenience of description, the areas are described, but a prediction sample (pixel) of the sub prediction unit may be generated from an average value (or a weighted sum) of samples (pixels) in the L0 and L1 prediction blocks.

A prediction block P0 of an upper left sub prediction unit of the current block may be generated from the average value of the prediction block P_A (i.e., an area corresponding to P0 in P_A) and the prediction block P_C (i.e., an area corresponding to P0 in P_C).

A prediction block P1 of an upper right sub prediction unit of the current block may be generated from the average value of the prediction block P_A (i.e., an area corresponding to P1 in P_A) and the prediction block P_D (i.e., an area corresponding to P1 in P_D).

A prediction block P2 of a lower left sub prediction unit of the current block may be generated from the average value of the prediction block P_B (i.e., an area corresponding to P2 in P_B) and the prediction block P_C (i.e., an area corresponding to P2 in P_C).

A prediction block P3 of a lower right sub prediction unit of the current block may be generated from the average value of the prediction block P_B (i.e., an area corresponding to P3 in P_B) and the prediction block P_D (i.e., an area corresponding to P3 in P_D).

In addition, the decoder may generate the prediction block for the current block by merging the prediction blocks of the respective generated sub prediction units.

That is, the prediction block P for the current block may be generated by merging the prediction block P0 of the upper left sub prediction unit of the current block, the prediction block P1 of the upper right sub prediction unit of the current block, the prediction block P2 of the lower left sub prediction unit of the current block, and the prediction block P3 of the lower right sub prediction unit of the current block.

Meanwhile, the L0 prediction unit includes a plurality of prediction units (in the case of FIG. 11, two 2N×N size prediction units) and further, the L1 prediction unit includes a plurality of prediction units (in the case of FIG. 11, two N×2N size prediction units).

In this case, as illustrated in FIG. 11, the same reference picture may be used for each L0 prediction unit (the first L0 prediction unit and the second L0 prediction unit) and similarly, the same reference picture may be used for each L1 prediction unit (the first L1 prediction unit and the second L1 prediction unit). That is, each L0 prediction unit may be subjected to the inter prediction by referring to the same reference picture and each L1 prediction unit may be subjected to the inter prediction by referring to the same reference picture.

Alternatively, different reference pictures may be used for each L0 prediction unit (the first L0 prediction unit and the second L0 prediction unit) and different reference pictures may be used for each L1 prediction unit (the first L1 prediction unit and the second L1 prediction unit). That is, each L0 prediction unit may be subjected to the inter prediction by referring to different reference pictures within the L0 reference picture list and each L1 prediction unit may be subjected to the inter prediction by referring to different reference pictures within the L1 reference picture list.

Meanwhile, the prediction blocks (i.e., P0, P1, P2, and P3) of the sub prediction units of the current block may be generated from the weighted sum of the prediction blocks (i.e., P_A and P_B) of the L0 prediction unit and the prediction blocks (P_C and P_D) of the L1 prediction unit.

For example, a first weight w_1 may be applied to the reference picture L0 1110 (that is, the prediction block of the L0 prediction unit) and a second weight w_2 may be applied to the reference picture L1 1120 (that is, the prediction block of the L1 prediction unit) (where w_1+w_2=1).

In this case, the prediction block P0 of the upper left sub prediction unit of the current block may be generated from the sum of P_A*w_1 and P_C w_2.

The prediction block P1 of the upper right sub prediction unit of the current block may be generated from the sum of P_A w_1 and P_C w_2.

The prediction block P2 of the lower left sub prediction unit of the current block may be generated from the sum of P_B*w_1 and P_C*w_2.

The prediction block P3 of the lower right sub prediction unit of the current block may be generated from the sum of P_B w_1 and P_D*w_2.

In addition, the decoder may generate the prediction block for the current block by merging the prediction blocks of the respective generated sub prediction units.

In this case, the weight applied to each L0/L1 reference picture (or each L0/L1 prediction block) may be determined by the encoder and signaled to the decoder and in this case, the decoder may generate the prediction block of each sub prediction unit by applying the weight received from the encoder. Alternatively, the decoder may generate the prediction block of each sub prediction unit by applying a predetermined weight.

The embodiment of FIG. 11 above is similar to an effect that the prediction unit of the current block is partitioned into N×N in that the prediction block is generated based on two reference blocks for each sub prediction, but the additional information amount may be reduced by adding one partitioning mode instead of partitioning information.

FIG. 12 is a diagram illustrating a method for generating a prediction block by applying a different partitioning mode for each reference picture according to an embodiment of the present invention.

In FIG. 12, illustrated is a case where when it is assumed that the size of the current block (for example, coding block) is 2N×2N, the partitioning mode of the reference picture (reference picture L0) 1210 of reference picture list 0 is N×2N and the partitioning mode of the reference picture (reference picture L1) 1220 of reference picture list 1 is nL×2N.

The sub prediction unit of the current block may be determined by combining the partitioning mode for each reference picture. That is, as illustrated in FIG. 12, when the partitioning mode of the L0 reference picture 1210 is N×2N and the partitioning mode of the L1 reference picture 1220 is nL×2N, a left prediction unit of the current block may be determined as an nL×2N size, an intermediate prediction unit may be determined as an (N−nL)×2N size, and a right prediction unit may be determined as an N×2N size.

As described above, the decoder may generate the prediction block of the sub prediction unit by using the prediction block of the L0 prediction unit and the prediction block of the L1 prediction unit and generate the prediction block of the current block by merging the prediction blocks. In addition, the decoder sums and then merges the prediction block and the residual block for each sub prediction unit or sums the prediction block of the current block and the residual block to generate the reconstructed block for the current block.

More specifically, the decoder may derive motion information of the L0 prediction unit (first prediction unit) and derive motion information of the L1 prediction unit (second prediction unit).

The decoder generates the prediction block (i.e., P_A and P_B) of the L0 prediction unit and the prediction block (P_C and P_D) of the L1 prediction unit by using the derived motion information. That is, the prediction block P_A of a first L0 prediction unit is generated from the reference block (or reference sample) in the L0 reference picture using the motion information of the prediction unit, the prediction block P_B of a second L0 prediction unit is generated from the reference block (or reference sample) within the L0 reference picture using the motion information of the prediction unit, the prediction block P_C of a first L1 prediction unit is generated from the reference block (or reference sample) in the L1 reference picture by using the motion information of the prediction unit, and the prediction block P_D of a second L1 prediction unit is generated from the reference block (or reference sample) in the L1 reference picture using the motion information of the prediction unit.

In addition, the prediction blocks (i.e., P0, P1, and P2) of the sub prediction units of the current block may be generated from the average values (or weighted sums) of the prediction blocks (i.e., P_A and P_B) of the L0 prediction unit and the prediction blocks (P_C and P_D) of the L1 prediction unit.

In other words, the prediction blocks (i.e., P0, P1, P2, and P3) for each sub prediction unit of the current block may be generated from the average values of the areas corresponding to the corresponding sub prediction units within the prediction blocks (i.e., P_A and P_B) of the L0 prediction unit and the prediction blocks (P_C and P_D) of the L1 prediction unit.

A prediction block P0 of a left sub prediction unit of the current block may be generated from the average value of the prediction block P_A (i.e., an area corresponding to P0 in P_A) and the prediction block P_C (i.e., an area corresponding to P0 in P_C).

A prediction block P1 of an intermediate sub prediction unit of the current block may be generated from the average value of the prediction block P_A (i.e., an area corresponding to P1 in P_A) and the prediction block P_D (i.e., an area corresponding to P1 in P_D).

A prediction block P2 of a right sub prediction unit of the current block may be generated from the average value of the prediction block P_B (i.e., an area corresponding to P2 in P_B) and the prediction block P_D (i.e., an area corresponding to P2 in P_D).

In addition, the decoder may generate the prediction block for the current block by merging the prediction blocks of the respective generated sub prediction units.

That is, the prediction block P for the current block may be generated by merging the prediction block P0 of the left sub prediction unit of the current block, the prediction block P1 of the intermediate sub prediction unit of the current block, and the prediction block P2 of the right sub prediction unit of the current block.

Meanwhile, as described above, the L0 prediction unit includes a plurality of prediction units (in the case of FIG. 12, two N×2N size prediction units) and further, the L1 prediction unit includes a plurality of prediction units (in the case of FIG. 12, nL×2N size and (2N−nL)×2N size prediction units).

In this case, as illustrated in FIG. 12, the same reference picture may be used for each L0 prediction unit (the first L0 prediction unit and the second L0 prediction unit) and similarly, the same reference picture may be used for each L1 prediction unit (the first L1 prediction unit and the second L1 prediction unit).

Alternatively, different reference pictures may be used within the L1 reference picture list for each L0 prediction unit (the first L0 prediction unit and the second L0 prediction unit) and different reference pictures may be used within the L1 reference picture list for each L1 prediction unit (the first L1 prediction unit and the second L1 prediction unit).

Meanwhile, the prediction blocks (i.e., P0, P1, and P2) of the sub prediction units of the current block may be generated from the weighted sum of the prediction blocks (i.e., P_A and P_B) of the L0 prediction unit and the prediction blocks (P_C and P_D) of the L1 prediction unit.

For example, a first weight w_1 may be applied to the reference picture L0 1210 (that is, the prediction block of the L0 prediction unit) and a second weight w_2 may be applied to the reference picture L1 1220 (that is, the prediction block of the L1 prediction unit) (where w_1+w_2=1).

In this case, the prediction block P0 of the left sub prediction unit of the current block may be generated from the sum of P_A w_1 and P_C*w_2.

The prediction block P1 of the intermediate sub prediction unit of the current block may be generated from the sum of PA*w_1 and P_C w_2.

The prediction block P2 of the right sub prediction unit of the current block may be generated from the sum of P_B*w_1 and P_C*w_2.

In addition, the decoder may generate the prediction block for the current block by merging the prediction blocks of the respective generated sub prediction units.

In this case, the weight applied to each L0/L1 reference picture (or each L0/L1 prediction block) may be determined by the encoder and signaled to the decoder and in this case, the decoder may generate the prediction block of each sub prediction unit by applying the weight received from the encoder. Alternatively, the decoder may generate the prediction block of each sub prediction unit by applying a predetermined weight.

According to the embodiment of FIG. 12 above, there is an effect in that the prediction error may be reduced by supporting the intermediate sub prediction unit P1 which may not be supported only by the existing partitioning mode.

Meanwhile, in FIG. 11 above, a case where the L0 partitioning mode is 2N×N, the L1 partitioning mode is N×2 N is illustrated and in FIG. 12, a case where the L0 partitioning mode is N×2N and the L1 partitioning mode is nL×2N is illustrated, but the present invention is not limited thereto.

That is, even when the L0 partitioning mode is any one of the partitioning modes shown in Table 1 above and the L1 partitioning mode is any one of other partitioning modes other than the L0 partitioning mode among the partitioning modes shown in Table 1 above, the prediction block may be generated for each sub prediction unit of the current block in the same scheme as above. In addition, the prediction block for the current block may be generated by merging the prediction blocks of the respective generated sub prediction units.

Further, in FIGS. 11 and 12 above, the partitioning mode for the prediction unit in which the inter prediction is performed using the L0 reference picture and the partitioning mode for the prediction unit in which the inter prediction is performed using the L1 reference picture are illustrated and described, but the present invention is not limited thereto.

That is, by extending the above embodiment, prediction units of a block to be currently encoded/decoded are partitioned according to a plurality of partitioning modes (i.e., mixed mode) and the plurality of partitioning modes is combined to determine the sub prediction unit and the prediction block for the current block may be generated for each determined sub prediction unit. This will be described with reference to the following drawing.

FIG. 13 is a diagram illustrating a method for generating a prediction block by applying a plurality of partitioning modes according to an embodiment of the present invention.

In FIG. 13, a case where when it is assumed that the size of the current block (for example, coding unit) is 2N×2N, the first partitioning mode is 2N×N and the second partitioning mode is N×2N is illustrated. However, as described above, the method may be similarly applied even to the case where the first partitioning mode is any one of the partitioning modes shown in Table 1 above and the second partitioning mode is any one of other partitioning modes other than the first partitioning mode among the partitioning modes shown in Table 1 above.

The prediction unit of the current block may be determined by combining the respective partitioning modes. That is, as illustrated in FIG. 13, when the first partitioning mode is 2N×N and the second partitioning mode is N×2N, the sub prediction unit of the current block may be determined as an N×N size.

The decoder may generate the prediction block of the sub prediction unit by using the prediction block of the prediction unit (first prediction unit) according to the first partitioning mode and the prediction block of the prediction unit (second prediction unit) of the second partitioning mode and generate the prediction block of the current block by merging the prediction blocks. The prediction block of the current block may be generated by the sub prediction unit determined by combining the first partitioning mode and the second partitioning mode by using the prediction block of the first prediction unit and the prediction block of the second prediction unit.

More specifically, the decoder may derive motion information of each first prediction unit and derive motion information for each second prediction unit.

Here, different inter prediction modes may be applied for each first first prediction unit, second first prediction unit, first second prediction unit, and second second prediction unit. For example, the prediction block of any prediction unit of the first first prediction unit, the second first prediction unit, the first second prediction unit, and the second second prediction unit may be generated in the merge mode and the prediction block of any prediction unit may be generated in the AMVP mode.

When the merge mode is applied, the encoder may configure the merge candidate list for the current prediction unit as in the example of FIG. 7 and signal to the decoder a merge candidate index 'merge_idx' for specifying the candidate block information selected by performing motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In addition, the residual block for the current prediction unit is decoded and the residual block and the prediction block are summed to generate the reconstructed block.

On the contrary, when the AMVP mode is applied, the encoder may configure the motion vector prediction value candidate list for the current prediction unit as in the example of FIG. 7 above and signal to the decoder a selected motion vector prediction value flag 'mvp_lX_flag' selected by performing the motion estimation, a difference value mvd between the motion vector of the current prediction unit and the motion vector prediction value indicated by the motion vector prediction value flag, and the reference picture index. The decoder may configure the motion vector prediction value candidate list in the same scheme as the encoder and derive the motion vector prediction value indicated by the motion vector prediction value flag. In addition, the derived motion vector prediction value and the received motion vector difference value mvd are added to derive the motion vector of the current prediction unit. In addition, the prediction block of the current prediction unit may be generated by using the reference picture index and the motion vector. In this case, it is not limited that a unidirectional prediction is particularly applied to each prediction unit and a bi-directional prediction may be applied.

Further, different reference pictures may be used for each first first prediction unit, second first prediction unit, first second prediction unit, and second second prediction unit. For example, even though the same AMVP mode is applied to the first first prediction unit and the second first prediction unit, the prediction block may be generated by using different reference pictures unlike the examples of FIGS. 11 and 12. In this case, different reference pictures may be used in the same reference picture list (i.e., L0 list or L1 list) and different reference pictures included in different reference picture lists may be used.

Further, different motion vectors may be used for each first first prediction unit, second first prediction unit, first second prediction unit, and second second prediction unit. For example, even though the same reference picture is used in the first first prediction unit and the second first prediction unit, the prediction block may be generated from different reference blocks by using different motion vectors.

The decoder may generate the prediction blocks (i.e., P_A, P_B, P_C, and P_D) by using the motion information derived with respect to each of the first first prediction unit, the second first prediction unit, the first second prediction unit, and the second second prediction unit.

In addition, the prediction block P of the current block may be generated as the sub prediction unit. That is, the prediction blocks (i.e., P0, P1, P2, and P3) of the respective sub prediction units are generated and the prediction blocks (i.e., P0, P1, P2, and P3) of the respective sub prediction units are merged to generate the prediction block P of the current block.

The prediction blocks (i.e., P0, P1, P2, and P3) for each sub prediction unit of the current block may be generated with the average values of the areas corresponding to the corresponding sub prediction units within the prediction blocks (i.e., P_A and P_B) of the L0 prediction unit and the prediction blocks (P_C and P_D) of the L1 prediction unit.

A prediction block P0 of an upper left sub prediction unit of the current block may be generated from the average value of the prediction block P_A (i.e., an area corresponding to P0 in P_A) and the prediction block P_C (i.e., an area corresponding to P0 in P_C).

A prediction block P1 of an upper right sub prediction unit of the current block may be generated from the average value of the prediction block P_A (i.e., an area corresponding to P1 in P_A) and the prediction block P_D (i.e., an area corresponding to P1 in P_D).

A prediction block P2 of a lower left sub prediction unit of the current block may be generated from the average value of the prediction block P_B (i.e., an area corresponding to P2 in P_B) and the prediction block P_C (i.e., an area corresponding to P2 in P_C).

A prediction block P3 of a lower right sub prediction unit of the current block may be generated from the average value of the prediction block P_B (i.e., an area corresponding to P3 in P_B) and the prediction block P_D (i.e., an area corresponding to P3 in P_D).

In addition, the decoder may generate the prediction block for the current block by merging the prediction blocks of the respective generated sub prediction units.

Alternatively, the prediction blocks (i.e., P0, P1, P2, and P3) of the sub prediction units of the current block may be generated from the weighted sum of the prediction blocks (i.e., P_A and P_B) of the first prediction unit and the prediction blocks (P_C and P_D) of the second prediction unit.

For example, a first weight w_1 may be applied to the prediction block of the first prediction unit and a second weight w_2 may be applied to the prediction block of the second prediction unit (where w_1+w_2=1).

In this case, the prediction block P0 of the upper left sub prediction unit of the current block may be generated from the sum of P_A*w_1 and P_C w_2.

The prediction block P1 of the upper right sub prediction unit of the current block may be generated from the sum of P_A w_1 and P_C*w_2.

The prediction block P2 of the lower left sub prediction unit of the current block may be generated from the sum of P_B*w_1 and P_C*w_2.

The prediction block P3 of the lower right sub prediction unit of the current block may be generated from the sum of P_B*w_1 and P_D*w_2.

In addition, the decoder may generate the prediction block for the current block by merging the prediction blocks of the respective generated sub prediction units.

The weight applied to each prediction block may be determined by the encoder and signaled to the decoder and in this case, the decoder may generate the prediction block of each sub prediction unit by applying the weight received from the encoder. Alternatively, the decoder may generate the prediction block of each sub prediction unit by applying a predetermined weight.

In this case, since different inter prediction modes, reference pictures, and motion vectors may be used for each first first prediction unit, second first prediction unit, first second prediction unit, and second second prediction unit as described above, the weights applied to the prediction blocks used to generate the prediction blocks of the corresponding sub prediction units may be determined separately for each sub prediction unit.

Embodiment 2

As described above, the present invention may be extended by a method of using different reference pictures for each prediction unit according to each partitioning mode, but hereinafter, in the embodiment, the present invention will be described by assuming a case where different partitioning modes are supported for each reference picture for convenience of description.

As the embodiment according to the present invention, in the case of the bidirectional prediction, a syntax (or syntax element) may be defied as in Table 2 below in order to support different partitioning modes for each reference picture.

TABLE 2

| Syntax | Definition |
|---|---|
| part_mode | part_mode indicates the partitioning mode of the current coding unit. When part_mode_2nd exists, part_mode indicates the partitioning mode of the reference picture of reference picture list 0 (L0) for the coding unit. |
| inter_pred_idc | inter_pred_idc indicates whether the current prediction unit is a list 0 (list 0) unidirectional prediction, a list 1 (list 1) unidirectional prediction, or a bidirectional prediction. inter_pred_idc indicates that the current coding unit is the bidirectional prediction having different partitioning modes when 'part_mode' and 'part_mode_2nd' are different from each other. |
| part_mode_2nd | part_mode_2nd indicates the partitioning mode of the reference picture of reference picture list 1 (L1) for the current coding unit. |

Referring to Table 2, 'part_mode' may indicate the partitioning mode of the current coding unit. That is, 'part_mode' may indicate a mode in which the current coding unit is partitioned into a plurality of prediction units.

'part_mode_2nd' may be signaled from the encoder to the decoder only when different partitioning modes are applied to the current coding unit for each reference picture.

Thus, when 'part_mode_2nd' is signaled, a meaning indicated by 'part_mode' may be redefined. Alternatively, when 'part_mode_2nd' is signaled and 'part_mode' and 'part_mode_2nd' are different from each other, the meaning indicated by 'part_mode' may be redefined. Alternatively, when 'part_mode_2nd' is signaled, 'part_mode' and 'part_mode_2nd' are different from each other, and the current prediction unit is a first prediction unit within the coding unit, the meaning indicated by 'part_mode' may be redefined.

When the meaning indicated by 'part_mode' is redefined as described above, 'part_mode' indicates a partitioning mode (that is, first partitioning information) of the L0 reference picture for the current coding unit. That is, the current coding unit may be partitioned into a plurality of prediction units (i.e., L0 prediction unit or first prediction unit) according to the partitioning mode indicated by 'part_mode'. In addition, the prediction is performed by referring to the L0 reference picture to generate the prediction blocks (i.e., L0 prediction unit or first prediction unit) of the respective prediction units.

Simultaneously, 'part_mode_2nd' indicates a partitioning mode (that is, second partitioning information) of the L1 reference picture for the current coding unit. That is, the current coding unit may be partitioned into a plurality of prediction units (i.e., L1 prediction unit or second prediction unit) according to the partitioning mode indicated by 'part_mode_2nd'. In addition, the prediction is performed by referring to the L0 reference picture to generate the prediction blocks (i.e., L1 prediction block or second prediction block) of the respective prediction units.

'inter_pred_idc' may be signaled from the encoder to the decoder as the prediction unit when different partitioning modes are not applied to the current coding unit for each reference picture. On the contrary, when 'part_mode_2nd' is signaled and 'part_mode' and 'part_mode_2nd' are different from each other, 'inter_pred_idc' indicates that the bidirectional prediction is applied as the coding unit.

FIG. 14 is a diagram illustrating a method for parsing a syntax element of a coding unit from a bitstream according to an embodiment of the present invention.

Referring to FIG. 14, the decoder parses skip indication information (for example, a coding unit skip flag 'cu_skip_flag') of a coding unit to be decoded at present (S1401).

In step S1401, as the 'cu_skip_flag' parsing result, when the 'cu_skip_flag' value is 1, the decoder parses a merge candidate index 'merge_idx' (S1402).

'cu_skip_flag' may indicate whether to parsing the syntax element for the current coding unit. That is, 'cu_skip_flag' may indicate whether a skip mode is applied to the current coding unit.

When 'cu_skip_flag' is 1, the decoder does not parse the syntax element any longer except for the merge candidate index 'merge_idx'.

'merge_idx' indicates the merging candidate index of the merging candidate list. That is, as in the example of FIG. 7 above, the encoder configures the merging candidate list for the current coding unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, since the skip mode is applied, the residual block for the current coding unit may not be signaled from the encoder and the prediction block may correspond to the reconstructed block.

On the contrary, when a value of 'cu_skip_flag' is 0 as a result of parsing 'cu_skip_flag', the decoder parses a prediction mode flag 'pred_mode_flag' for the current coding unit (S1403).

'pred_mode_flag' indicates whether the current coding unit is encoded in the inter prediction mode or encoded in the intra prediction mode.

When 'pred_mode_flag' indicates the inter prediction (INTER) as a result of parsing 'pred_mode_flag', the decoder parses the partitioning mode 'part_mode' (S1404).

In FIG. 14, the intra prediction process is omitted for convenience of description and the case where the current coding unit is encoded in the inter prediction mode, but the present invention is not limited thereto and the case where the current coding unit is encoded in the intra prediction mode may also be applied, of course. That is, when 'pred_mode_flag' indicates the intra prediction (INTRA) as a result of parsing 'pred_mode_flag' in S1403, the current coding unit may be decoded based on the intra prediction mode.

'part_mode' indicates the partitioning mode for the current coding unit. For example, 'part_mode' may be defined similarly to Table 1 above, defined as a part of Table 1, or defined to be include other partitioning modes together with Table 1.

In step S1404, the current coding unit is partitioned into a plurality of prediction units according to the partitioning mode specified by 'part_mode' and subsequent processes are performed for each partitioned prediction unit. For example, the subsequent processes may be performed for each prediction unit according to a direction from left to right or from top to bottom.

First, the decoder parses a merge flag 'merge_flag' for the current prediction block.

'merge_flag' specifies whether an inter prediction parameter for the current prediction unit is induced from a neighboring inter-predicted part (or block). In other words, 'merge_flag' specifies whether the aforementioned merge mode is applied for predicting the current prediction unit.

When the merge mode is applied as the result of 'merge_flag' in step S1405, the decoder parses a merge index ('merge_index') (S1406).

'merge_idx' indicates the merging candidate index of the merging candidate list. That is, as in the example of FIG. 7 above, the encoder configures the merging candidate list for the current prediction unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, unlike the aforementioned skip mode, the residual block for the current prediction unit may be signaled from the encoder and the residual block and the prediction block are summed to generate the reconstructed block.

Thereafter, the decoder determines whether the current prediction unit is a last prediction unit (S1415).

In addition, as a result of determination in step S1415, when the current prediction unit is the last prediction unit, a process of parsing the syntax element of the current coding unit is ended. On the contrary, as the result of the determination in step S1415, when the current prediction unit is not the last prediction unit, the process is branched to the previous step of step S1405 above (partition loop) and performed from step S1405.

Meanwhile, when the merge mode is not applied as the result of parsing 'merge_flag' in step S1405, the decoder parses an inter prediction index 'inter_pred_idc' (S1406).

'inter_pred_idc' may indicate whether a list 0 unidirectional prediction PRED_L0, a list 1 unidirectional prediction PRED_L1, or a bidirectional prediction PRED_BI is applied to the current prediction unit.

The decoder determines condition 1 (cond1) (S1408).

Here condition 1 (cond1) may include whether the current prediction unit adopts the bidirectional prediction and the current prediction unit is the first prediction unit (for example, if(inter_pred_idc==PRED_BI && first PU)).

As a result of determination in step S1408, when the current prediction unit adopts the bidirectional prediction and the current prediction unit is the first prediction unit, the decoder parses the second partitioning mode (part_mode_2nd) (S1409).

'part_mode_2nd' indicates the partitioning mode of the L1 reference picture for the current coding unit.

For example, 'part_mode_2nd' may be defined similarly to Table 1 above, defined as a part of Table 1, or defined to be include other partitioning modes together with Table 1.

The decoder determines condition 2 (cond2) (S1410).

Here, condition 2 (cond2) includes whether the partitioning mode of the L0 reference picture and the partitioning mode of the L1 reference picture are different from each other (for example, if(part_mode !=part_mode_2nd)).

As such, when part_mode_2nd exists (i.e., signaled from the encoder) and part_mode and part_mode_2nd are different by condition 2 (cond2), 'part_mode' may indicate the partitioning mode of the L0 reference picture for the current coding unit and part_mode_2nd may indicate the partitioning mode of the L1 reference picture for the current coding unit.

The syntax after 'part_mode' in the related art indicates information of each prediction unit, but when 'part_mode' and 'part_mode_2nd' are different from each other, 'inter_pred_idc' indicating the bidirectional prediction (that is, having a value of PRED_BI) indicates the bidirectional prediction for the current coding unit. In addition, the decoder parses all of bidirectional motion information for the current coding unit in the corresponding loop (steps S1411 and S1412). That is, the decoder parses all motion information for the respective prediction units partitioned from the current coding unit.

The decoder parses the motion information for each L0 prediction unit partitioned by 'part_mode' (S1411). That is, the decoder parses an L0 reference picture index 'ref_idx_l0', a motion vector difference value mvd, and an L0 motion vector prediction value flag 'mvp_l0_flag' for each L0 prediction unit partitioned by 'part_mode'. For example, the decoder may parse the motion information of the second L0 prediction unit by parsing the motion information of the first L0 prediction unit and branching the process to the previous step of S1411.

In this case, in a case where the L0 prediction unit is 2N×2N when the current coding unit is 2N×2N, step S1411 may not be repeatedly performed with respect to the L0 prediction unit (that is, performed once without applying the partition loop).

The decoder parses the motion information for each L1 prediction unit partitioned by 'part_mode_2nd' (S1412). That is, the decoder parses an L1 reference picture index 'ref_idx_l1', a motion vector difference value mvd, and an L1 motion vector prediction value flag 'mvp_l1_flag' for each L1 prediction unit partitioned by 'part_mode_2nd'. For example, the decoder may parse the motion information of the second L1 prediction unit by parsing the motion information of the first L1 prediction unit and branching the process to the previous step of S1411.

In this case, in the case where the L1 prediction unit is 2N×2N when the current coding unit is 2N×2N, step S1412 may not be repeatedly performed with respect to the L1 prediction unit (that is, performed once without applying the partition loop).

'ref_idx_lx' (x=0, 1) indicates the reference picture index of the reference list (L0 or L1) for the current prediction unit.

'mvp_lx_flag' indicates the motion vector prediction value index in the motion vector prediction value candidate list of the reference list (L0 or L1) for the current prediction unit. The motion vector corresponding to the motion vector prediction value index indicated by 'mvp_lx_flag' may be derived as the motion vector prediction value for the current predicted unit.

The motion vector difference value mvd indicates a difference value of the motion vector for the current prediction unit and the motion vector prediction value. That is, the motion vector difference value mvd indicates a value acquired by subtracting the motion vector prediction value of the current prediction unit derived by 'mvp_lx_flag' from the motion vector of the current prediction unit.

When the AMVP mode is applied as such, the encoder may configure the motion vector prediction value candidate list for the current prediction unit as in the example of FIG. 7 above and signal to the decoder a selected motion vector prediction value flag 'mvp_lX_flag' selected by performing the motion estimation, a difference value mvd between the motion vector of the current prediction unit and the motion vector prediction value indicated by the motion vector prediction value flag, and the reference picture index. The decoder may configure the motion vector prediction value candidate list in the same scheme as the encoder and derive the motion vector prediction value indicated by the motion vector prediction value flag. In addition, the derived motion vector prediction value and the received motion vector difference value mvd are added to derive the motion vector of the current prediction unit. In addition, the prediction block of the current prediction unit may be generated by using the reference picture index and the motion vector.

In FIG. 14, an example in which the motion information for the L0 prediction unit is parsed and the motion information for the L1 prediction unit is parsed is illustrated, but a parsing order of the motion information for the L0 prediction unit and the L1 prediction unit may be transformed to various combinations described below. In the following example, it is assumed that both the L0 prediction unit and the L1 prediction unit are two prediction units, respectively, but the present invention is not limited thereto.

The motion information may be parsed in the order of L0 first prediction unit→L0 second prediction unit→L1 first prediction unit→L1 second prediction unit.

Alternatively, the motion information may be parsed in the order of L0 first prediction unit→L1 first prediction unit→L0 second prediction unit→L1 second prediction unit.

Alternatively, the motion information may be parsed in the order of L1 first prediction unit→L1 second prediction unit→L0 first prediction unit→L0 second prediction unit.

Alternatively, the motion information may be parsed in the order of L1 first prediction unit→L0 first prediction unit→L1 second prediction unit→L0 second prediction unit.

When the motion information of both the L0 prediction unit partitioned by 'part_mode' and the L1 prediction unit partitioned by 'part_mode_2nd' is all parsed, the parsing process of the syntax element of the current coding unit is ended.

On the contrary, as the result of the determination in step S1408, when the current prediction unit does not adopt the bidirectional prediction or is not the first prediction unit, the decoder parses the unidirectional or bidirectional motion information of the current prediction unit (S1413 and S1414).

Further, as the result of the determination in step S1410, when 'part_mode_2nd' is the same mode as 'part_mode' even though 'part_mode_2nd' exists (that is, when condition 2 (cond2) is not satisfied), the decoder parses the unidirectional or bidirectional motion information of the current prediction unit (S1413 and S1414).

That is, the decoder parses a reference picture index 'ref_idx_lx' (x=0, 1), a motion vector difference value mvd, and a motion vector prediction value flag 'mvp_lx_flag' (x=0, 1) of the current prediction unit partitioned by 'part_mode' (S1413 and S1414).

In this case, when the unidirectional prediction is applied to the current prediction unit, step S1413 or step S1414 is performed according to the direction (i.e., whether the L0 reference picture is used or the L1 reference picture is used).

On the other hand, when the bidirectional prediction is applied to the current prediction unit, steps S1413 and S1414 are performed.

Thereafter, the decoder determines whether the current prediction unit is a last prediction unit (S1415).

In addition, as a result of determination in step S1415, when the current prediction unit is the last prediction unit, a process of parsing the syntax element of the current coding unit is ended. On the contrary, as the result of the determination in step S1415, when the current prediction unit is not the last prediction unit, the process is branched to the previous step of step S1405 above (partition loop) and performed from step S1405.

The embodiment is designed to be applied when the first prediction unit is neither in the merge mode nor in the unidirectional prediction mode. In other words, the bidirectional motion information of the current block is predicted from the motion information of the neighboring block to keep occurrence of the additional information amount to the minimum with respect to the merge mode to reduce the motion information amount and the unidirectional prediction unit capable of reducing the prediction error only by the When a syntax structure as shown in FIG. 14 is applied, in a combination of a merge MERGE, an AMVP-UNI mode for unidirectional prediction, an AMVP-BI mode prediction unit for bidirectional prediction, information (i.e., syntax elements) generated per coding unit for each partitioning mode is illustrated in Table 3 below.

In Table 3, the case of N×N partitioning mode is omitted for simple comparison, but the present invention is not limited thereto. In Table 3, LX motion information (LX MV Data) (X=0, 1) includes reference picture index ref_idx_Ix, motion vector prediction value flag mvp_Ix_flag, and a motion vector difference value mvd information.

TABLE 3

| Partitioning mode | 2N × 2N (1PU) | 2N × N, N × 2N의 2PU (2PU) | Mixed mode. (1PU and 2PU) | Mixed mode. (2PU and 2PU) |
|---|---|---|---|---|
| 1. MERGE | cu_skip_flag pred_mode_flag part_mode merge_flag × 1 merge_idx × 1 | cu_skip_flag pred_mode_flag part_mode merge_flag × 2 merge_idx × 2 | Na | Na |
| 2. MERGE, AMVP-UNI 3. AMVP-UNI, MERGE | Na | cu_skip_flag pred_mode_flag part_mode merge_flag × 2 merge_idx × 1 inter_pred_idc × 1 L0 MV Data × 1 | Na | Na |
| 4. MERGE, AMVP-BI 5. AMVP-BI, MERGE* | Na | cu_skip_flag pred_mode_flag part_mode merge_flag × 2 merge_idx × 1 inter_pred_idc × 1 part_mode_2nd × 1* L0 MV Data × 1 L1 MV Data × 1 | Na | Na |
| 6. AMVP-UNI | cu_skip_flag pred_mode_flag part_mode merge_flag × 1 inter_pred_idc × 1 L0 MV Data × 1 | cu_skip_flag pred_mode_flag part_mode merge_flag × 2 inter_pred_idc × 2 L0 MV Data × 2 | Na | Na |
| 7. AMVP-UNI, AMVP-BI 8. AMVP-BI, AMVP-UNI* | Na | cu_skip_flag pred_mode_flag part_mode merge_flag × 2 inter_pred_idc × 2 part_mode_2nd × 1* L0 MV Data × 2 L1 MV Data × 1 | Na | Na |
| 9. AMVP-BI | cu_skip_flag pred_mode_flag part_mode merge_flag × 1 inter_pred_idc × 1 part_mode_2nd × 1 L0 MV Data × 1 L1 MV Data × 1 | cu_skip_flag pred_mode_flag part_mode merge_flag × 2 inter_pred_idc × 2 part_mode_2nd × 1 L0 MV Data × 2 L1 MV Data × 2 | cu_skip_flag pred_mode_flag part_mode merge_flag × 1 inter_pred_idc × 1 part_mode_2nd × 1 L0 MV Data × 2 L1 MV Data × 1 | cu_skip_flag pred_mode_flag part_mode merge_flag × 1 inter_pred_idc × 1 part_mode_2nd × 1 L0 MV Data × 2 L1 MV Data × 2 | already defined partitioning mode in the related art. To this end, when the first prediction unit of the current coding unit is in the merge mode or the AMVP mode (AMVP-UNI) to perform the unidirectional prediction, the information amount may be maintained similarly to the existing syntax, but when the corresponding condition is not satisfied, that is, only when the first prediction unit is in the AMVP mode (AMVP-BI) to perform the bidirectional prediction, 'part_mode_2nd' may be added.

In Table 3, a notation '*' indicates an additional syntax element in the case of the corresponding combination. Further, in Table 3, the inter prediction mode is represented by the first prediction unit and the second prediction unit in order.

When condition 1 is satisfied in step S1408 in FIG. 14 above (that is, when the bidirectional prediction is applied and the current prediction unit is the first prediction unit), 'part_mode_2nd' information may be additionally signaled from the encoder to the decoder and the decoder may parse 'part_mode_2nd'.

Referring to Table 3, when the prediction unit of the 2N×2N partitioning mode adopts an AMVP mode (i.e., 9. AMVP-BI) to perform the bidirectional prediction or when the first prediction unit of the partitioning mode other than 2N×N and N×2N adopts a bidirectional AMVP mode (AMVP-BI) (that is, 5. AMVP-BI, MERGE*/8. AMVP-BI, AMVP-UNI*/9. AMVP-BI), 'part_mode_2nd' information may be additionally signaled and the decoder may parse 'part_mode_2nd'. That is, even if condition 2 is not satisfied in step S1410 in FIG. 14 (even if 'part_mode' and 'part_mode_2nd' are the same as each other), 'part_mode_2nd' may be parsed by the 'part_mode_2nd' information.

Referring to Table 3, in the case where a plurality of partitioning modes (i.e., a mixed mode) is used, the additional information of 'part_mode_2nd' may be increased, but by performing the inter prediction by combining various prediction unit types, the prediction error may be reduced, thereby reducing the residual signal. Further, according to the embodiment of the present invention, since only the additional information of 'part_mode_2nd' increases, the information amount may be reduced as compared with bits required for transmitting additional information for indicating partitioning of the coding unit in order to reduce the size of the prediction unit.

Embodiment 3

As described above, the present invention may be extended by a method of using different reference pictures for each prediction unit according to each partitioning mode, but hereinafter, in the embodiment, the present invention will be described by assuming a case where different partitioning modes are supported for each reference picture for convenience of description.

In the embodiment 2 above, even though the first partitioning mode and the second partitioning mode have the same partitioning mode, a case of parsing 'part_mode_2nd' may occur. In order to prevent the parsing, in the case of the bidirectional prediction, a syntax (or syntax element) may be defied as in Table 4 below in order to support different partitioning modes for each reference picture.

TABLE 4

| Syntax | Definition |
| --- | --- |
| part_mode | part_mode indicates a partitioning mode of a current coding unit. When part_mode_2nd exists, part_mode indicates the partitioning mode of the reference picture of reference picture list 0 (L0) for the coding unit. |
| inter_pred_idc | inter_pred_idc indicates whether the current prediction unit is a list 0 (list 0) unidirectional prediction, a list 1 (list 1) unidirectional prediction, or a bidirectional prediction. Additionally, inter_pred_idc indicates whether the current coding unit is a bidirectional prediction and has a different partitioning mode for each reference picture (see Tables 5 and 6). |
| part_mode_2nd | part_mode_2nd indicates the partitioning mode of the reference picture of reference picture list 1 (L1) for the current coding unit. |

Referring to Table 4, 'part_mode' may indicate the partitioning mode of the current coding unit. That is, 'part_mode' may indicate a mode in which the current coding unit is partitioned into a plurality of prediction units (partitioning modes or partitioning information).

'part_mode_2nd' may be signaled from the encoder to the decoder only when different partitioning modes are applied to the current coding unit for each reference picture.

Thus, when 'part_mode_2nd' is signaled, a meaning indicated by 'part_mode' may be redefined. Alternatively, when 'part_mode_2nd' is signaled and 'part_mode' and 'part_mode_2nd' are different from each other, the meaning indicated by 'part_mode' may be redefined. Alternatively, when 'part_mode_2nd' is signaled, 'part_mode' and 'part_mode_2nd' are different from each other, and the current prediction unit is a first prediction unit within the coding unit, the meaning indicated by 'part_mode' may be redefined.

When the meaning indicated by 'part_mode' is redefined as described above, 'part_mode' indicates a partitioning mode (that is, first partitioning information) of the L0 reference picture for the current coding unit. That is, the current coding unit may be partitioned into a plurality of prediction units (i.e., L0 prediction unit or first prediction unit) according to the partitioning mode indicated by 'part_mode'. In addition, the prediction is performed by referring to the L0 reference picture to generate the prediction blocks (i.e., L0 prediction unit or first prediction unit) of the respective prediction units.

Simultaneously, 'part_mode_2nd' indicates a partitioning mode (that is, second partitioning information) of the L1 reference picture for the current coding unit. That is, the current coding unit may be partitioned into a plurality of prediction units (i.e., L1 prediction unit or second prediction unit) according to the partitioning mode indicated by 'part_mode_2nd'. In addition, the prediction is performed by referring to the L0 reference picture to generate the prediction blocks (i.e., L1 prediction block or second prediction block) of the respective prediction units.

'inter_pred_idc' indicates a case where the bidirectional prediction is applied to the current coding unit (or prediction unit) and 'part_mode' and 'part_mode_2nd' are different from each other.

Table 5 illustrates definition of 'inter_pred_idc'.

TABLE 5

| | Name of inter_pred_idc | |
| --- | --- | --- |
| inter_pred_idc | (nPbW + nPbH) != 12 | (nPbW + nPbH) == 12 |
| 0 | PRED_L0 | PRED_L0 |
| 1 | PRED_L1 | PRED_L1 |
| 2 | PRED_BI | Na |
| 3 | PRED_BI_MIXED | Na |

Referring to Table 5, '0' of 'inter_pred_idc' denotes a unidirectional prediction PRED_L0 of a reference picture list 0 (list0), '1' denotes a unidirectional prediction PRED_L1 of a reference picture list 1 list1, and '2' denotes a bi directional prediction PRED_BI. In addition, '3' denotes a mode PRED_BI_MIXED which is a bidirectional prediction and has a different partitioning mode for each reference picture.

If the sum of a width nPbW of a prediction unit (or block) and a height nPbH of the prediction unit (or block) is not equal to 12, the above four modes may all be supported. On the other hand, when the sum of the width nPbW of the prediction unit (or block) and the height nPbH of the prediction unit (or block) is 12, only the L0 unidirectional prediction PRED_L0 and L1 unidirectional prediction PRED_L1 may be supported.

In HEVC, since only unidirectional prediction is allowed when the prediction unit is 8×4 or 4×8, it is possible to extend this rule as it is as shown in Table 6 below.

Table 6 illustrates another definition of 'inter_pred_idc'.

TABLE 6

| | Name of inter_pred_idc | | |
|---|---|---|---|
| inter_pred_idc | (nPbW + nPbH) != 12 && (nPbW + nPbH) >= 32 | (nPbW + nPbH) != 12 && (nPbW + nPbH) < 32 | (nPbW + nPbH) == 12 |
| 0 | PRED_L0 | PRED_L0 | PRED_L0 |
| 1 | PRED_L1 | PRED_L1 | PRED_L1 |
| 2 | PRED_BI | PRED_BI | Na |
| 3 | PRED_BI_MIXED | Na | Na |

Referring to Table 6, when the sum of nPbW and nPbH is not equal to 12 and the sum of nPbW and nPbH is equal to or larger than 32, all of the four modes described above may be supported.

On the other hand, if the sum of nPbW and nPbH is not equal to 12 and the sum of nPbW and nPbH is smaller than 32, PRED_BI_MIXED may not be supported.

When the sum of nPbW and nPbH is equal to 12, only PRED_L0 and PRED_L1 may be supported.

In other words, 'inter_pred_idc' may be defined so that a PRED_BI_MIXED mode is not applied when the size of prediction unit is smaller than 1616, that is, 16×8, 8×16, 4×16, 12×16, 16×4, 16×12, and 8×8.

Meanwhile, Tables 5 and 6 above are merely illustrative, and the present invention is not limited thereto. That is, PRED_BI_MIXED may be supported regardless of the size of the prediction unit.

In addition, whether the PRED_BI_MIXED mode is supported may be determined according to the size of the prediction unit. For example, when the size of the prediction unit is a specific size, the size may be limited so that the PRED_BI_MIXED mode is not supported, but at this time, the size of the prediction unit to be a reference may be defined differently.

FIG. 15 is a diagram illustrating a method for parsing a syntax element of a coding unit from a bitstream according to an embodiment of the present invention.

Referring to FIG. 15, the decoder parses skip indication information (for example, a coding unit skip flag 'cu_skip_flag') of a coding unit to be decoded at present (S1501).

In step S1501, as the 'cu_skip_flag' parsing result, when the 'cu_skip_flag' value is 1, the decoder parses a merge candidate index 'merge_idx' (S1502).

'cu_skip_flag' may indicate whether to parse the syntax element for the current coding unit. That is, 'cu_skip_flag' may indicate whether a skip mode is applied to the current coding unit.

When 'cu_skip_flag' is 1, the decoder does not parse the syntax element any longer except for the merge candidate index 'merge_idx'.

'merge_idx' indicates the merging candidate index of the merging candidate list. That is, as in the example of FIG. 7 above, the encoder configures the merging candidate list for the current coding unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, since the skip mode is applied, the residual block for the current coding unit may not be signaled from the encoder and the prediction block may correspond to the reconstructed block.

On the contrary, when a value of 'cu_skip_flag' is 0 as a result of parsing 'cu_skip_flag' in step S1401, the decoder parses a prediction mode flag 'pred_mode_flag' for the current coding unit (S1503).

'pred_mode_flag' indicates whether the current coding unit is encoded in the inter prediction mode or encoded in the intra prediction mode.

When 'pred_mode_flag' indicates the inter prediction (INTER) as a result of parsing 'pred_mode_flag' in step S1503, the decoder parses the partitioning mode 'part_mode' (S1504).

In FIG. 15, the intra prediction process is omitted for convenience of description and the case where the current coding unit is encoded in the inter prediction mode, but the present invention is not limited thereto and the case where the current coding unit is encoded in the intra prediction mode may also be applied, of course. That is, when 'pred_mode_flag' indicates the intra prediction (INTRA) as a result of parsing 'pred_mode_flag' in step S1503, the current coding unit may be decoded based on the intra prediction mode.

'part_mode' indicates the partitioning mode for the current coding unit. For example, 'part_mode' may be defined equally to Table 1 above, defined as a part of Table 1, or defined to be include other partitioning modes together with Table 1.

In step S1504, the current coding unit is partitioned into a plurality of prediction units according to the partitioning mode specified by 'part_mode' and subsequent processes are performed for each partitioned prediction unit. For example, the subsequent processes may be performed for each prediction unit according to a direction from left to right or from top to bottom.

First, the decoder parses a merge flag 'merge_flag' for the current prediction block (S1505).

'merge_flag' specifies whether an inter prediction parameter for the current prediction unit is induced from a neighboring inter-predicted part (or block). In other words, 'merge_flag' specifies whether the aforementioned merge mode is applied for predicting the current prediction unit.

When the merge mode is applied as the result of 'merge_flag' in step S1505, the decoder parses a merge index ('merge_index') (S1506).

'merge_idx' indicates the merging candidate index of the merging candidate list. That is, as in the example of FIG. 7 above, the encoder configures the merging candidate list for the current prediction unit and signals to the decoder the merging candidate index 'merge_idx' for specifying the candidate block information selected by performing the motion estimation. The decoder may configure the merge candidate list in the same scheme as the encoder and identify the candidate block specified by the merge candidate index. In addition, the reference picture index and the motion vector of the current prediction unit may be derived from the motion information of the identified candidate block. In addition, the prediction block of the current prediction unit may be generated by using the derived reference picture index and motion vector. In this case, unlike the aforementioned skip mode, the residual block for the current prediction unit may be signaled from the encoder and the residual block and the prediction block are summed to generate the reconstructed block.

Thereafter, the decoder determines whether the current prediction unit is a last prediction unit (S1514).

In addition, as a result of determination in step S1514, when the current prediction unit is the last prediction unit, a process of parsing the syntax element of the current coding unit is ended. On the contrary, as the result of the determination in step S1514, when the current prediction unit is not the last prediction unit, the process is branched to the previous step of step S1505 above (partition loop) and performed from step S1405.

Meanwhile, when the merge mode is not applied as the result of parsing 'merge_flag' in step S1505, the decoder parses an inter prediction index 'inter_pred_idc' (S1506).

'inter_pred_idc' may indicate whether a list 0 unidirectional prediction PRED_L0, a list 1 unidirectional prediction PRED_L1, a bidirectional prediction PRED_BI or a bidirectional prediction PRED_BI_MIXED having a different partitioning mode for each reference picture is applied to the current prediction unit.

The decoder determines condition 1 cond1 (S1508).

Here, the condition 1 (cond1) may include whether the current prediction unit (or prediction unit) is a bidirectional prediction having different partitioning modes (for example, if (inter_pred_idc==PRED_BI_MIXED)).

As a result of determination in step S1508, when the current prediction unit (or prediction unit) adopts the bidirectional prediction PRED_BI_MIXED having different partitioning modes, the decoder parses the second partitioning mode part_mode_2nd (S1509).

'part_mode_2nd' indicates the partitioning mode of the L1 reference picture for the current coding unit.

For example, 'part_mode_2nd' may be defined similarly to Table 1 above, defined as a part of Table 1, or defined to include other partitioning modes together with Table 1.

As such, when part_mode_2nd exists (i.e., signaled from the encoder), 'part_mode' may indicate the partitioning mode of the L0 reference picture for the current coding unit and part_mode_2nd may indicate the partitioning mode of the L1 reference picture for the current coding unit.

By 'inter_pred_idc', 'part_mode_2nd' exists only when the L0 partitioning mode and the L1 partitioning mode are different from each other, and the decoder parses all bidirectional motion information for the corresponding coding unit. That is, the decoder parses all motion information for the respective prediction units partitioned from the current coding unit.

The decoder parses the motion information for each L0 prediction unit partitioned by 'part_mode' (S1510). That is, the decoder parses an L0 reference picture index 'ref_idx_l0', a motion vector difference value mvd, and an L0 motion vector prediction value flag 'mvp_l0_flag' for each L0 prediction unit partitioned by 'part_mode'. For example, the decoder may parse the motion information of the second L0 prediction unit by parsing the motion information of the first L0 prediction unit and branching the process to the previous step of S1510.

In this case, in a case where the L0 prediction unit is 2N×2N when the current coding unit is 2N×2N, step S1510 may not be repeatedly performed with respect to the L0 prediction unit (that is, performed once without applying the partition loop).

The decoder parses the motion information for each L1 prediction unit partitioned by 'part_mode_2nd' (S1511). That is, the decoder parses an L1 reference picture index 'ref_idx_l1', a motion vector difference value mvd, and an L1 motion vector prediction value flag 'mvp_l1_flag' for each L1 prediction unit partitioned by 'part_mode_2nd'. For example, the decoder may parse the motion information of the second L1 prediction unit by parsing the motion information of the first L1 prediction unit and branching the process to the previous step of S1511.

In this case, in the case where the L1 prediction unit is 2N×2N when the current coding unit is 2N×2N, step S1511 may not be repeatedly performed with respect to the L1 prediction unit (that is, performed once without applying the partition loop).

'ref_idx_lx' (x=0, 1) indicates the reference picture index of the reference list L0 or L1 for the current prediction unit.

'mvp_lx_flag' indicates the motion vector prediction value index in the motion vector prediction value candidate list of the reference list L0 or L1 for the current prediction unit. The motion vector corresponding to the motion vector prediction value index indicated by 'mvp_lx_flag' may be derived as the motion vector prediction value for the current predicted unit.

The motion vector difference value mvd indicates a difference value of the motion vector for the current prediction unit and the motion vector prediction value. That is, the motion vector difference value mvd indicates a value acquired by subtracting the motion vector prediction value of the current prediction unit derived by 'mvp_lx_flag' from the motion vector of the current prediction unit.

When the AMVP mode is applied as such, the encoder may configure the motion vector prediction value candidate list for the current prediction unit as in the example of FIG. 7 above and signal to the decoder a selected motion vector prediction value flag 'mvp_lX_flag' selected by performing the motion estimation, a difference value mvd between the motion vector of the current prediction unit and the motion vector prediction value indicated by the motion vector prediction value flag, and the reference picture index. The decoder may configure the motion vector prediction value candidate list in the same scheme as the encoder and derive the motion vector prediction value indicated by the motion vector prediction value flag. In addition, the derived motion vector prediction value and the received motion vector difference value mvd are added to derive the motion vector of the current prediction unit. In addition, the prediction block of the current prediction unit may be generated by using the reference picture index and the motion vector.

In FIG. 15, an example in which the motion information for the L0 prediction unit is parsed and the motion information for the L1 prediction unit is parsed is illustrated, but a parsing order of the motion information for the L0 prediction unit and the L1 prediction unit may be transformed to various combinations described below. In the following example, it is assumed that both the L0 prediction unit and the L1 prediction unit are two prediction units, respectively, but the present invention is not limited thereto.

The motion information may be parsed in the order of L0 first prediction unit→L0 second prediction unit→L1 first prediction unit→L1 second prediction unit.

Alternatively, the motion information may be parsed in the order of L0 first prediction unit→L1 first prediction unit→L0 second prediction unit→L1 second prediction unit.

Alternatively, the motion information may be parsed in the order of L1 first prediction unit→L1 second prediction unit→L0 first prediction unit→L0 second prediction unit.

Alternatively, the motion information may be parsed in the order of L1 first prediction unit→L0 first prediction unit→L1 second prediction unit→L0 second prediction unit.

When the motion information of both the L0 prediction unit partitioned by 'part_mode' and the L1 prediction unit partitioned by 'part_mode_2nd' is all parsed, the parsing process of the syntax element of the current coding unit is ended.

On the contrary, as a result of determination in step S1508, when the current prediction unit (or prediction unit) does not adopt the bidirectional prediction PRED_BI_MIXED having different partitioning modes, the decoder parses the unidirectional or bidirectional motion information of the current prediction unit (S1512 and S1513).

That is, the decoder parses a reference picture index 'ref_idx_lx' (x=0, 1), a motion vector difference value mvd, and a motion vector prediction value flag 'mvp_lx_flag' (x=0, 1) of the current prediction unit partitioned by 'part_mode' (S1512 and S1513).

In this case, when the unidirectional prediction is applied to the current prediction unit, step S1512 or step S1513 is performed according to the direction (i.e., whether the L0 reference picture is used or the L1 reference picture is used).

On the other hand, when the bidirectional prediction is applied to the current prediction unit, steps S1512 and S1513 are performed.

Thereafter, the decoder determines whether the current prediction unit is a last prediction unit (S1514).

In addition, as a result of determination in step S1514, when the current prediction unit is the last prediction unit, a process of parsing the syntax element of the current coding unit is ended. On the contrary, as the result of the determination in step S1514, when the current prediction unit is not the last prediction unit, the process is branched to the previous step of step S1505 above (partition loop) and performed from step S1505.

When a syntax structure as shown in FIG. 15 is applied, in a combination of a merge MERGE, an AMVP-UNI mode for unidirectional prediction, an AMVP-BI mode prediction unit for bidirectional prediction, information (i.e., syntax elements) generated per coding unit for each partitioning mode is illustrated in Table 7 below.

In Table 7, the case of N×N partitioning mode is omitted for simple comparison, but the present invention is not limited thereto. In Table 7, LX motion information (LX MV Data) (X=0, 1) includes a reference picture index ref_idx_lx, a motion vector prediction value flag mvp_lx_flag, and a motion vector difference value mvd.

TABLE 7

| Partitioning mode | 2N × 2N (1PU) | 2PU other than 2N × N, N × 2N (2PU) | Mixed × mode. (1PU and 2PU) | Mixed × mode. (2PU and 2PU) |
|---|---|---|---|---|
| 1. MERGE | cu_skip_flag pred_mode_flag part_mode merge_flag × 1 merge_idx × 1 | cu_skip_flag pred_mode_flag part_mode merge_flag × 2 merge_idx × 2 | Na | Na |
| 2. MERGE, AMVP-UNI 3. AMVP-UNI, MERGE | Na | cu_skip_flag pred_mode_flag part_mode merge_flag × 2 merge_idx × 1 inter_pred_idc × 1 L0 MV Data × 1 | Na | Na |
| 4. MERGE, AMVP-BI 5. AMVP-BI, MERGE | Na | cu_skip_flag pred_mode_flag part_mode merge_flag × 2 merge idx × 1 inter_pred_idc × 1 L0 MV Data × 1 L1 MV Data × 1 | Na | Na |
| 6. AMVP-UNI | cu_skip_flag pred_mode_flag part_mode merge_flag × 1 inter_pred_idc × 1 L0 MV Data × 1 | cu_skip_flag pred_mode_flag part_mode merge_flag × 2 inter_pred_idc × 2 L0 MV Data × 2 | Na | Na |
| 7. AMVP-UNI, AMVP-BI 8. AMVP-BI, AMVP-UNI | Na | cu_skip_flag pred_mode_flag part_mode merge_flag × 2 inter_pred_idc × 2 L0 MV Data × 2 L1 MV Data × 1 | Na | Na |
| 9. AMVP-BI | cu_skip_flag pred_mode_flag part_mode merge_flag × 1 inter_pred_idc × 1 | cu_skip_flag pred_mode_flag part_mode merge_flag × 2 inter_pred_idc × 2 | cu_skip_flag pred_mode_flag part_mode merge_flag × 1 inter_pred_idc × 1 | cu_skip_flag pred_mode_flag part_mode merge_flag × 1 inter_pred_idc × 1 |

TABLE 7-continued

| Partitioning mode | 2N × 2N (1PU) | 2PU other than 2N × N, N × 2N (2PU) | Mixed × mode. (1PU and 2PU) | Mixed × mode. (2PU and 2PU) |
|---|---|---|---|---|
| | L0 MV Data × 1 | L0 MV Data × 2 | part_mode_2nd × 1 | part_mode_2nd × 1 |
| | L1 MV Data × 1 | L1 MV Data × 2 | L0 MV Data × 2 | L0 MV Data × 2 |
| | | | L1 MV Data × 2 | L1 MV Data × 2 |

In Table 7, the inter prediction mode is expressed in the order of the first prediction unit and the second prediction unit.

In the present embodiment, when a plurality of different partitioning modes is not applied for the current coding unit like the embodiment 2 described above by adding the mode to 'inter_pred_idc' (i.e., a single partitioning mode is applied), 'part_mode_2nd' information is not required and thus, unnecessary data are not generated, thereby reducing the information amount for additional information. In addition, prediction errors may be reduced by performing the inter prediction by combining various types of prediction units, thereby reducing a residual difference signal.

Embodiment 4

As a method for reducing the information amount of an added second partitioning mode (e.g., part_mode_2nd) to support another partitioning mode for each reference picture, a most probable mode (MPM) candidate list for the second partitioning mode may be configured as shown in Tables 8 and 9 below based on a first partitioning mode (e.g., part_mode).

The encoder may signal to the decoder a value corresponding to the second partitioning mode in the MPM candidate list configured based on the first partitioning mode.

Like the embodiment 2 above, Table 8 illustrates the MPM candidate list when the second partitioning mode exists even when the first partitioning mode and the second partitioning mode are the same as each other.

TABLE 8

| part_mode | 2Nx2N | 2NxN | Nx2N | NxN |
|---|---|---|---|---|
| part_mode_2nd | 0: 2Nx2N | 0: 2NxN | 0: Nx2N | 0: NxN |
| | 1: 2NxN | 1: 2Nx2N | 1: 2Nx2N | 1: 2NxN |
| | 2: Nx2N | 2: 2NxnU | 2: nLx2N | 2: Nx2N |
| | 3: NxN | 3: 2NxnD | 3: nRx2N | 3: 2Nx2N |
| | 4: 2NxnU | 4: NxN | 4: NxN | 4: 2NxnU |
| | 5: 2NxnD | 5: Nx2N | 5: 2NxN | 5: 2NxnD |
| | 6: nLx2N | 6: nLx2N | 6: 2NxnU | 6: nLx2N |
| | 7: nRx2N | 7: nRx2N | 7: 2NxnD | 7: nRx2N |

Referring to Table 8, since the probability of similarity between the first partitioning mode part_mode and the second partitioning mode part_mode_2nd is high, a smaller number of bits are allocated to a partitioning mode similar to the first partitioning mode part_mode, and on the other hand, a large number of bits may be allocated.

A value of '0' may be allocated to the same partitioning mode as the first partitioning mode part_mode (i.e., the partitioning mode having the same partitioning width and partitioning height as the first partitioning mode).

Similarly, a smaller value may be preferentially allocated to a partitioning mode similar to the first partitioning mode part_mode (i.e., the partitioning mode having the same partitioning width or partitioning height as the first partitioning mode). Then, the remaining values may be allocated to the remaining partitioning modes.

Like the embodiment 3 above, Table 9 illustrates an MPM candidate list when the second partitioning mode exists only when the first partitioning mode and the second partitioning mode are different from each other.

TABLE 9

| part_mode | 2Nx2N | 2NxN | Nx2N | NxN |
|---|---|---|---|---|
| part_mode_2nd | 0: 2NxN | 0: 2Nx2N | 0: 2Nx2N | 0: 2NxN |
| | 1: Nx2N | 1: 2NxnU | 1: nLx2N | 1: Nx2N |
| | 2: NxN | 2: 2NxnD | 2: nRx2N | 2: 2Nx2N |
| | 3: 2NxnU | 3: NxN | 3: NxN | 3: 2NxnU |
| | 4: 2NxnD | 4: Nx2N | 4: 2NxN | 4: 2NxnD |
| | 5: nLx2N | 5: nLx2N | 5: 2NxnU | 5: nLx2N |
| | 6: nRx2N | 6: nRx2N | 6: 2NxnD | 6: nRx2N |

Referring to Table 9, like Table 6 above, since the probability of similarity between the first partitioning mode part_mode and the second partitioning mode part_mode_2nd is high, a smaller number of bits are allocated to a partitioning mode similar to the first partitioning mode part_mode, and on the other hand, a large number of bits may be allocated.

However, unlike Table 8, an MPM candidate list may be configured except for the same partitioning mode as the first partitioning mode part_mode (i.e., the partitioning mode having the same partitioning width and partitioning height as the first partitioning mode).

A smaller value may be preferentially allocated to a partitioning mode similar to the first partitioning mode part_mode (i.e., the partitioning mode having the same partitioning width or partitioning height as the first partitioning mode). Then, the remaining values may be allocated to the remaining partitioning modes.

The mode of the second partitioning mode part_mode_2nd may be variously applied according to the first partitioning mode part_mode, and the similar method may be applied even when the first partitioning mode part_mode is an asymmetric mode.

Tables 8 and 9 above illustrate only one example of the MPM candidate list for the second partitioning mode, and the number of modes of the second partitioning mode part_mode_2nd constituting the MPM candidate list may be different from this. In addition, the order of indexes indicating the first partitioning mode part_mode_2nd may be varied according to the first partitioning mode part_mode.

Embodiment 5

In the present embodiment, a method of binarizing an inter prediction index 'inter_pred_idc' is proposed.

Table 10 illustrates a method of binarizing an existing inter-prediction index 'inter_pred_idc'.

TABLE 10

| inter_pred_idc | Name of inter_pred_idc | Bin string | |
|---|---|---|---|
| | | (nPbW + nPbH) != 12 | (nPbW + nPbH) == 12 |
| 0 | PRED_L0 | 00 | 0 |
| 1 | PRED_L1 | 01 | 1 |
| 2 | PRED_BI | 1 | — |

Referring to Table 10, '0' of 'inter_pred_idc' denotes a unidirectional prediction PRED_L0 of a reference picture list 0 (list0), '1' denotes a unidirectional prediction PRED_L1 of a reference picture list 1 (list1), and '2' denotes a bi directional prediction PRED_BI.

If the sum of a width nPbW of a prediction unit (or block) and a height nPbH of the prediction unit (or block) is not equal to 12, the above three modes may all be supported. At this time, PRED_L0 may be binarized to 00, PRED_L1 may be binarized to 01, and PRED_BI may be binarized to 1.

On the other hand, when the sum of the width nPbW of the prediction unit (or block) and the height nPbH of the prediction unit (or block) is 12, only the L0 unidirectional prediction PRED_L0 and L1 unidirectional prediction PRED_L1 may be supported. At this time, PRED_L0 may be binarized to 0 and PRED_L1 may be binarized to 1.

The binarization of the inter prediction index inter_pred_idc and the second partitioning mode part_mode_2nd according to the present invention may be applied by extending the existing method of binarizing 'inter_pred_idc'.

First, a method of binarizing the inter prediction index inter_pred_idc will be described.

Table 11 and Table 12 illustrate a method of binarizing the inter-prediction index inter_pred_idc by adding a mode PRED_BI_MIXED, which is a bidirectional prediction and different from the partitioning mode for each reference picture, to the inter prediction mode inter_pred_idc according to the present invention.

TABLE 11

| inter_pred_idc | Name of inter_pred_idc | Bin string | |
|---|---|---|---|
| | | (nPbW + nPbH) != 12 | (nPbW + nPbH) == 12 |
| 0 | PRED_L0 | 000 | 0 |
| 1 | PRED_L1 | 001 | 1 |
| 2 | PRED_BI | 1 | — |
| 3 | PRED_BI_MIXED | 01 | — |

Referring to Table 10, '0' of 'inter_pred_idc' denotes a unidirectional prediction PRED_L0 of a reference picture list 0 (list0), '1' denotes a unidirectional prediction PRED_L1 of a reference picture list 1 (list1), '2' denotes a bi directional prediction PRED_BI, and '3' denotes a mode PRED_BI_MIXED, which is a bi-directional prediction and different from the partitioning mode for each reference picture.

In this case, the order of each inter prediction mode and/or the number of bits allocated to each inter prediction mode may vary depending on the size of the prediction unit.

If the sum of a width nPbW of a prediction unit (or block) and a height nPbH of the prediction unit (or block) is not equal to 12, the above four modes may all be supported. At this time, PRED_L0 may be binarized to 000, PRED_L1 may be binarized to 001, PRED_BI may be binarized to 1, and PRED_BI_MIXED may be binarized to 01.

On the other hand, when the sum of the width nPbW of the prediction unit (or block) and the height nPbH of the prediction unit (or block) is 12, only the L0 unidirectional prediction PRED_L0 and L1 unidirectional prediction PRED_L1 may be supported. At this time, PRED_L0 may be binarized to 0 and PRED_L1 may be binarized to 1.

TABLE 12

| inter_pred_idc | Name of inter_pred_idc | Bin string |
|---|---|---|
| 0 | PRED_L0 | 10 |
| 1 | PRED_L1 | 11 |
| 2 | PRED_BI | 00 |
| 3 | PRED_BI_MIXED | 01 |

Referring to Table 12, PRED_L0 may be binarized to 10, PRED_L1 may be binarized to 11, PRED_BI may be binarized to 01, and PRED_BI_MIXED may be binarized to 01. As such, the number of bits allocated to all inter prediction modes may be the same.

Next, a method of binarizing the second partitioning mode part_mode_2nd will be described.

Table 13 below illustrates the method of binarizing the existing partition mode part_mode.

TABLE 13

| part_mode | PartMode | Bin string (log2CbSize > MinCbLog2SizeY) | |
|---|---|---|---|
| | | lamp_enabled_flag | amp_enabled_flag |
| 0 | PART_2Nx2N | 1 | 1 |
| 1 | PART_2NxN | 01 | 011 |
| 2 | PART_Nx2N | 00 | 001 |
| 3 | PART_NxN | — | — |
| 4 | PART_2NxnU | — | 0100 |
| 5 | PART_2NxnD | — | 0101 |
| 6 | PART_nLx2N | — | 0000 |
| 7 | PART_nRx2N | — | 0001 |

Referring to Table 13, the method of binarizing the partitioning mode may be varied depending on the size and condition of the coding unit (i.e., whether asymmetric partitioning of the prediction unit is supported). The binarization of the partitioning mode is defined differently depending on the size of the coding unit. However, for convenience of description, Table 12 illustrates only the case where a size log2CbSize of the coding unit is larger than a size MinCbLog2SizeY of a minimum coding unit.

An asymmetric partitioning activation flag 'amp_enabled_flag' indicates whether asymmetric motion partitioning (asymmetric partitioning of the prediction unit) is supported. For example, when 'amp_enabled_flag' is 1, 2NxnU, 2NxnD, nLx2N, and nRx2N partitioning modes, which are asymmetric motion partitioning (asymmetric partitioning of prediction unit), may be used. On the other hand, if amp_enabled_flag is 0 (i.e., ! Amp_enabled_flag is 1), the asymmetric motion partitioning (asymmetric partitioning of prediction unit) may not be supported.

The binarization method for the first partitioning mode part_mode_2nd may apply the same rule as the partitioning mode part_mode (i.e., the first partitioning mode). The second partitioning mode part_mode_2nd may be binarized as Table 14 below, based on the MPM candidate list of Table 9 above which applies the MPM for the second partitioning mode part_mode_2nd according to the partitioning mode part_mode.

Table 14 illustrates a method of binarizing the second partitioning mode part_mode_2nd when the first partitioning mode part_mode is 2N×N.

TABLE 14

| part_mode_2nd | PartMode2 | Bin string (log2CbSize > MinCbLog2SizeY) | |
|---|---|---|---|
| | | lamp_enabled_flag | amp_enabled_flag |
| 0 | PART_2Nx2N | 0 | 1 |
| 1 | PART_2NxnU | — | 011 |
| 2 | PART_2NxnD | — | 001 |
| 3 | PART_NxN | — | — |
| 4 | PART_2NxN | 1 | 0100 |
| 5 | PART_nLx2N | — | 0101 |
| 6 | PART_nRx2N | — | 0000 |

Table 14 illustrates a case where the size log2CbSize of the coding unit is larger than the size MinCbLog2SizeY of the minimum coding unit.

When 'amp_enabled_flag' is 1, 2N×nU, 2N×nD, nL×2N, and nR×2N partitioning modes, which are asymmetric motion partitioning (asymmetric partitioning of prediction unit), may be used. In this case, the 2N×2N partitioning mode may be binarized to 1, the 2N×nU partitioning mode may be binarized to 011, and the 2N×nD partitioning mode may be binarized to 001. Further, the 2N×N partitioning mode may be binarized to 0100, the nL×2N partitioning mode may be binarized to 0101, and the nR×2N partitioning mode may be binarized to 0000.

On the other hand, if 'amp_enabled_flag' is 1 (i.e., !Amp_enabled_flag is 1), the asymmetric motion partitioning (asymmetric partitioning of prediction unit) may not be supported. In this case, the 2N×2N partitioning mode may be binarized to 0, and the 2N×N partitioning mode may be binarized to 1.

FIG. 16 is a diagram illustrating an inter prediction method according to an embodiment of the present invention.

Referring to FIG. 16, the decoder derives motion information of a first prediction unit determined by the first partitioning mode of the current block and motion information of a second prediction unit determined by the second partitioning mode of the current block (S1601).

The decoder may derive the motion information for each first prediction unit and derive the motion information for each second prediction unit as illustrated in the embodiments 1 to 3 above.

At this time, examples of the first partitioning mode and the second partitioning mode may be part_mode and part_mode_2nd described above, respectively. As described above, the part_mode may be any one of the partitioning modes illustrated in Table 1, and the part_mode_2nd may be a partitioning mode other than part_mode among the partitioning modes illustrated in Table 1 above.

Like the embodiment 2 above, the second partitioning mode may be received when the current prediction unit is the first prediction unit and the bi-directional prediction is applied. Also, when the second partitioning mode is received and the first partitioning mode and the second partitioning mode are different from each other, the first partitioning mode may indicate the partitioning mode of a reference picture L0 of the reference picture list 0. Then, the second partitioning mode may indicate the partitioning mode of a reference picture L1 of the reference picture list 1. Also, when the second partitioning mode is received and the first partitioning mode and the second partitioning mode are different from each other, inter prediction direction information (e.g., inter_pred_idc) for the current block may indicate bidirectional prediction of the coding unit.

Like the embodiment 3 above, when the inter prediction direction information (e.g., inter_pred_idc) for the current block indicates that bi-directional prediction in which a different partitioning mode is used for each reference picture is applied to the current block, the second partitioning mode may be received. As such, when the second partitioning mode is received, the first partitioning mode may indicate the partitioning mode of the reference picture L0 of the reference picture list 0. Then, the second partitioning mode may indicate the partitioning mode of a reference picture L1 of the reference picture list 1.

Further, a most probable mode (MPM) candidate list for the second partitioning mode is configured based on the first partitioning mode, and the second partitioning mode may indicate a specific partitioning mode in the MPM candidate list. At this time, in the MPM candidate list, a value of 0 may be allocated to a partitioning mode having the same partitioning width and partitioning height as the first partitioning mode. Also, a smaller value may be preferentially allocated to the partitioning mode having the same partitioning width or partitioning height as the first partitioning mode.

The decoder generates a prediction block of the first prediction unit using the motion information of the first prediction unit, and generates a prediction block of the second prediction unit using the motion information of the second prediction unit (S1602).

At this time, like the embodiment 1 above, the first prediction block may be generated using the motion information from the reference picture L0 of the reference picture list 0, and the second prediction block may be generated using the motion information from the reference picture L1 of the reference picture list 1.

Also, like the embodiment 1 above, different inter prediction modes may be applied, different reference pictures may be used, or different motion vectors may be used for the first first prediction unit, the second first prediction unit, the first second prediction unit, and the second second prediction unit. Therefore, a prediction block of the corresponding prediction unit may be generated by using an inter prediction mode, a reference picture, and a motion vector that are independently determined for each prediction unit.

A prediction block of the current block is generated in a sub-prediction unit determined by combining the first prediction unit and the second prediction unit using the first prediction block and the second prediction block (S1603).

That is, like the embodiment 1 above, a sub-prediction unit of the current block may be determined by combining a plurality of partitioning modes. A prediction block of the sub-prediction unit may be generated by averaging or weighting a portion corresponding to the sub-prediction unit in the first prediction block and a portion corresponding to the sub-prediction unit in the second prediction block. Also, a prediction block of the current block may be generated by merging the prediction blocks of each sub-prediction unit.

FIG. 17 is a diagram illustrating an inter prediction unit according to an embodiment of the present invention.

In FIG. 17, for convenience of description, inter prediction units 181 and 261 (see FIGS. 1 and 2) is illustrated as one block, but the inter prediction units 181 and 261 may be implemented by a configuration included in the encoder and/or the decoder.

Referring to FIG. 17, the inter prediction units 181 and 261 implement the functions, procedures and/or methods proposed in FIGS. 5 to 16 above. Particularly, the inter prediction units 181 and 261 may be configured to include a motion information deriving unit 1703 and a prediction block generating unit 1704. In addition, the inter prediction units 181 and 261 may be configured to include a partitioning mode deriving unit 1701 and a prediction direction determining unit 1702.

The partitioning mode deriving unit 1701 derives a plurality of partitioning modes applied to the current block based on partitioning mode information on the current block received from the encoder.

The prediction direction determining unit 1701 determines an inter prediction direction of the current block based on the inter prediction direction information (e.g., inter_pred_idc) of the current block received from the encoder.

The motion information deriving unit 1702 derives motion information of the first prediction unit determined by the first partitioning mode of the current block and motion information of the second prediction unit determined by the second partitioning mode of the current block.

The motion information deriving unit 1702 may derive the motion information for each first prediction unit and derive the motion information for each second prediction unit as illustrated in the embodiments 1 to 3 above.

At this time, examples of the first partitioning mode and the second partitioning mode may be part_mode and part_mode_2nd described above, respectively. As described above, the part_mode may be any one of the partitioning modes illustrated in Table 1, and the part_mode_2nd may be a partitioning mode other than part_mode among the partitioning modes illustrated in Table 1 above.

Like the embodiment 2 above, the second partitioning mode may be received when the current prediction unit is the first prediction unit and the bi-directional prediction is applied. Also, when the second partitioning mode is received and the first partitioning mode and the second partitioning mode are different from each other, the first partitioning mode may indicate the partitioning mode of a reference picture L0 reference picture of the reference picture list 0. Then, the second partitioning mode may indicate the partitioning mode of a reference picture L1 of the reference picture list 1. At this time, when the second partitioning mode is received and the first partitioning mode and the second partitioning mode are different from each other, the prediction direction determining unit 1701 may determine that inter prediction direction information (e.g., inter_pred_idc) for the current block may indicates that the bidirectional prediction of the coding unit is applied to the current block.

Like the embodiment 3 above, when the inter prediction direction information (e.g., inter_pred_idc) for the current block indicates that bi-directional prediction in which a different partitioning mode is used for each reference picture is applied to the current block, the second partitioning mode may be received. That is, the prediction direction determining unit 1701 may determine that bi-directional prediction using different partitioning modes is applied to the current block for each reference picture, using the inter prediction direction information (e.g., inter_pred_idc) received from the encoder. As such, when the second partitioning mode is received, the first partitioning mode may indicate the partitioning mode of the reference picture L0 of the reference picture list 0. Then, the second partitioning mode may indicate the partitioning mode of a reference picture L1 of the reference picture list 1.

The partitioning mode deriving unit 1701 may configure a most probable mode (MPM) candidate list for the second partitioning mode based on the first partitioning mode. In addition, the second partitioning mode may be derived from the MPM candidate list by receiving a value (or index) indicating the second partitioning mode from the encoder. At this time, in the MPM candidate list, a value of 0 may be allocated to a partitioning mode having the same partitioning width and partitioning height as the first partitioning mode. Also, a smaller value may be preferentially allocated to the partitioning mode having the same partitioning width or partitioning height as the first partitioning mode.

The motion information deriving unit 1702 generates a prediction block of the first prediction unit using the motion information of the first prediction unit, and generates a prediction block of the second prediction unit using the motion information of the second prediction unit.

At this time, like the embodiment 1 above, in the motion information deriving unit 1703, the first prediction block may be generated using the motion information from the reference picture L0 of the reference picture list 0, and the second prediction block may be generated using the motion information from the reference picture L1 of the reference picture list 1.

Also, like the embodiment 1 above, different inter prediction modes may be applied, different reference pictures may be used, or different motion vectors may be used for the first first prediction unit, the second first prediction unit, the first second prediction unit, and the second second prediction unit. Therefore, a prediction block of the corresponding prediction unit may be generated by using an inter prediction mode, a reference picture, and a motion vector that are independently determined for each prediction unit.

The prediction block generating unit 1704 generates a prediction block of the current block in a sub-prediction unit determined by combining the first prediction unit and the second prediction unit using the first prediction block and the second prediction block.

That is, like the embodiment 1 above, the prediction block generating unit 1704 may determine a sub-prediction unit of the current block by combining a plurality of partitioning modes. A prediction block of the sub-prediction unit may be generated by averaging or weighting a portion corresponding to the sub-prediction unit in the first prediction block and a portion corresponding to the sub-prediction unit in the second prediction block. Also, a prediction block of the current block may be generated by merging the prediction blocks of each sub-prediction unit.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Hereinabove, the preferred embodiments of the present invention are disclosed for an illustrative purpose and hereinafter, modifications, changes, substitutions, or additions of various other embodiments will be made within the technical spirit and the technical scope of the present invention disclosed in the appended claims by those skilled in the art.

The invention claimed is:

1. A method for processing an image based on an inter prediction, the method comprising:
    obtaining a first partitioning mode of a current block based on a partitioning mode of a reference picture on a reference picture list 0 and a second partitioning mode of the current block based on a partitioning mode of a reference picture on a reference picture list 1;
    deriving first motion information of the current block based on the first partitioning mode of the current block and second motion information of the current block based on the second partitioning mode of the current block;
    generating a first prediction block by referring to the reference picture on the reference picture list 0 based on the first motion information and generating a second prediction block by referring to the reference picture on the reference picture list 1 based on the second motion information of the current block;
    generating a sub-prediction block of the current block by combining the first prediction block and the second prediction block; and
    processing the image based on the sub-prediction block.

2. The method of claim 1, wherein the sub-prediction block of the current block is generated by averaging or weighting a portion corresponding to the sub-prediction block of the current block in the first prediction block and a portion corresponding to the sub-prediction block of the current block in the second prediction block.

3. The method of claim 1, wherein based on a current prediction block being a first block and a bidirectional prediction being applied, the second partitioning mode is received.

4. The method of claim 3, wherein based on the second partitioning mode of the current block being received, and the first partitioning mode of the current block and the second partitioning mode of the current block being different, inter prediction direction information for the current block indicates a bi-directional prediction of a coding unit.

5. The method of claim 4, wherein based on the inter prediction direction information for the current block indicating that the bidirectional prediction in which different partitioning modes are used for each reference picture are used to the current block, the second partitioning mode of the current block is received.

6. The method of claim 1, wherein a most probable mode (MPM) candidate list for the second partitioning mode of the current block is configured based on the first partitioning mode of the current block.

7. The method of claim 6, wherein a value of 0 is allocated to a partitioning mode which has a same partitioning width and a same partitioning height as the first partitioning mode of the current block in the MPM candidate list.

8. The method of claim 6, wherein a first value is allocated to a partitioning mode which has only one of a same partitioning width or a same partitioning height as the first partitioning mode of the current block in the MPM candidate list,
    wherein a second value is allocated to a partitioning mode which has a different partitioning width and a different partitioning height as the first partitioning mode of the current block in the MPM candidate list, and
    wherein the first value is smaller than the second value.

9. The method of claim 1, wherein the first partitioning mode of the current block is any one of 2N×2N, 2N×N, N×2N, N×N, 2N×nU, 2N×nD, nL×2N, or nR×2N, and
    wherein the second partitioning mode of the current block is any one of partitioning modes different from the first partitioning mode of the current block.

10. The method of claim 1, wherein the first motion information and the second motion information include a reference picture index indicating a reference picture, a motion vector difference value, and motion vector prediction value information indicating a motion vector prediction value index within a motion vector prediction candidate list.

11. An apparatus for processing an image based on an inter prediction, the apparatus comprising:
    a processor configured to:
        obtain a first partitioning mode of a current block based on a partitioning mode of a reference picture on a reference picture list 0 and a second partitioning mode of the current block based on a partitioning mode of a reference picture on a reference picture list 1,
        derive first motion information of the current block based on the first partitioning mode of the current block and second motion information of the current block based on the second partitioning mode of the current block,
        generate a first prediction block by referring to the reference picture on the reference picture list 0 based on the first motion information and generating a second prediction block by referring to the reference picture on the reference picture list 1 based on the second motion information of the current block,
        generate a sub-prediction block of the current block by combining the first prediction block and the second prediction block, and
        process the image based on the sub-prediction block.

* * * * *